(12) United States Patent
Huang et al.

(10) Patent No.: US 12,004,100 B2
(45) Date of Patent: Jun. 4, 2024

(54) SYNCHRONIZATION METHOD AND APPARATUS, NETWORK ELEMENT, AND COMPUTER STORAGE MEDIUM

(71) Applicant: SANECHIPS TECHNOLOGY CO., LTD., Shenzhen (CN)

(72) Inventors: Shuhuai Huang, Shenzhen (CN); Zhuhong Gao, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 409 days.

(21) Appl. No.: 17/413,062

(22) PCT Filed: Sep. 23, 2019

(86) PCT No.: PCT/CN2019/107178
§ 371 (c)(1),
(2) Date: Jun. 11, 2021

(87) PCT Pub. No.: WO2020/119214
PCT Pub. Date: Jun. 18, 2020

(65) Prior Publication Data
US 2022/0046561 A1    Feb. 10, 2022

(30) Foreign Application Priority Data
Dec. 14, 2018   (CN) .......................... 201811536074.1

(51) Int. Cl.
*H04W 56/00*    (2009.01)
(52) U.S. Cl.
CPC ..... *H04W 56/001* (2013.01); *H04W 56/0035* (2013.01)
(58) Field of Classification Search
CPC ........... H04W 56/001; H04W 56/0035; H04W 56/00; H04W 56/0055
See application file for complete search history.

(56) References Cited

U.S. PATENT DOCUMENTS

2017/0273121 A1    9/2017   Tong
2017/0331888 A1   11/2017   Yoon
2018/0213500 A1*   7/2018   Li ........................ H04W 56/00

FOREIGN PATENT DOCUMENTS

CN    103167599 A    6/2013
CN    103428818 A   12/2013
(Continued)

OTHER PUBLICATIONS

International Search Report for corresponding application PCT/CN2019/107178 filed Sep. 23, 2019; dated Dec. 20, 2019.
(Continued)

*Primary Examiner* — Mohamed A Kamara
(74) *Attorney, Agent, or Firm* — CANTOR COLBURN LLP

(57) ABSTRACT

The disclosure discloses a synchronization method, which includes: sending first synchronization information carrying a Synchronization Signal (SS) and state information; receiving second synchronization information sent by a third terminal based on the first synchronization information after a first terminal has received synchronization information sent by a second terminal; under a condition the state information sent by the third terminal indicates that the third terminal enters a pre-synchronization state, determining receiving time information of the third terminal according to time domain resources used by transmission of the first synchronization information and receiving time information of the second terminal; sending third synchronization information, where the third synchronization information is used to trigger the third terminal to be synchronized with the first terminal; and synchronizing the first terminal with the third terminal according to the receiving time information of the third terminal. The disclosure also provides a synchroniza-
(Continued)

tion apparatus, a network element, and a computer storage medium.

17 Claims, 12 Drawing Sheets

(56) References Cited

FOREIGN PATENT DOCUMENTS

| CN | 108023695 A | 5/2018 |
|---|---|---|
| WO | 2015116940 A1 | 8/2015 |
| WO | 2016021963 A1 | 2/2016 |
| WO | 2018219334 A1 | 12/2018 |

OTHER PUBLICATIONS

Ming Bin, "Approach to Synchronization of Transmission Data Signal in Communication of UAV Downlinks" 1006-9348 (2018) 01-0047-05.

* cited by examiner

US 12,004,100 B2

SYNCHRONIZATION METHOD AND APPARATUS, NETWORK ELEMENT, AND COMPUTER STORAGE MEDIUM

TECHNICAL FIELD

The disclosure relates to the technical field of networks, and more particularly to a synchronization method and apparatus, a network element, and a computer storage medium.

BACKGROUND

In wireless mobile communication, a one-to-many terminal synchronization method only supports one-way communication, e.g. synchronization of a single broadcast station with multiple radios, or is very complex, e.g. synchronization of a single cell in a cellular network with multiple terminals, where complex technologies and processes such as random access and Time Advance (TA) are needed. The synchronization method brings the problems of device complexity, high cost, etc.

SUMMARY

Embodiments of the disclosure provide a synchronization method and apparatus, a network element, and a computer storage medium.

The technical solution of the disclosure is implemented as follows.

According to an aspect, a synchronization method is provided, which is applied to a first terminal and includes the following steps:

first synchronization information carrying a Synchronization Signal (SS) and state information is sent, where the state information is used to indicate a current state of the first terminal;

second synchronization information sent by a third terminal based on the first synchronization information is received after the first terminal has received synchronization information sent by a second terminal, where the second synchronization information includes: an SS and state information of the third terminal, and the state information of the third terminal is determined according to the state information of the first terminal;

under a condition the state information sent by the third terminal indicates that the third terminal enters a pre-synchronization state, receiving time information of the third terminal is determined according to time domain resources used by transmission of the first synchronization information and receiving time information of the second terminal;

third synchronization information is sent, where the third synchronization information is used to trigger the third terminal to be synchronized with the first terminal; and the first terminal is synchronized with the third terminal according to the receiving time information of the third terminal.

The disclosure also provides a synchronization method, which includes the following steps:

first synchronization information that is sent by a first terminal and carries an SS and state information is received, where the state information of the first terminal is used to indicate a current state of the first terminal;

sending time information of a third terminal is determined according to time domain resources used by transmission of the first synchronization information;

second synchronization information is sent based on the first synchronization information, where the second synchronization information includes: an SS and state information of the third terminal, and the state information of the third terminal is determined according to the state information of the first terminal;

third synchronization information sent by the first terminal based on the second synchronization information is received, where the third synchronization information is used to trigger the first terminal to be synchronized with the third terminal; and the third terminal is synchronized with the first terminal according to the sending time information of the third terminal.

The disclosure also provides a synchronization apparatus, which is applied to a first terminal and includes:

a first sending unit, configured to send first synchronization information carrying an SS and state information, where the state information is used to indicate a current state of the first terminal;

a first receiving unit, configured to receive second synchronization information sent by a third terminal based on the first synchronization information after the first terminal has received synchronization information sent by a second terminal, where the second synchronization information includes: an SS and state information of the third terminal, and the state information of the third terminal is determined according to the state information of the first terminal;

a first determination unit, configured to determine, under a condition the state information sent by the third terminal indicates that the third terminal enters a pre-synchronization state, receiving time information of the third terminal according to time domain resources used by transmission of the first synchronization information and receiving time information of the second terminal;

a second sending unit, configured to send third synchronization information, where the third synchronization information is used to trigger the third terminal to be synchronized with the first terminal; and a first synchronization unit, configured to synchronize the first terminal with the third terminal according to the receiving time information of the third terminal.

The disclosure also provides a synchronization apparatus, which includes:

a second receiving unit, configured to receive first synchronization information that is sent by a first terminal and carries an SS and state information, where the state information of the first terminal is used to indicate a current state of the first terminal;

a second determination unit, configured to determine sending time information of a third terminal according to time domain resources used by transmission of the first synchronization information;

a third sending unit, configured to send second synchronization information based on the first synchronization information, where the second synchronization information includes: an SS and state information of the third terminal, and the state information of the third terminal is determined according to the state information of the first terminal;

a second receiving unit, configured to receive third synchronization information sent by the first terminal based on the second synchronization information, where the third synchronization information is used to trigger the third terminal to be synchronized with the first terminal; and a second synchronization unit, configured to synchronize the third terminal with the first terminal according to the sending time information of the third terminal.

The disclosure also provides a network element, which includes:

a transceiver, a memory, and a processor.

The memory is configured to store computer executable instructions capable of implementing the synchronization method described above.

The processor is connected with the transceiver and the memory respectively, and configured to control the transceiver and the memory and execute the computer executable instructions.

The disclosure also provides a computer storage medium, storing computer executable instructions, where the computer executable instructions, when executed, are capable of implementing the synchronization method described above.

According to the synchronization method and apparatus, the network element, and the computer storage medium provided by the disclosure, first synchronization information carrying an SS and state information is sent, where the state information is used to indicate a current state of the first terminal; second synchronization information sent by a third terminal based on the first synchronization information is received after the first terminal has received synchronization information sent by a second terminal, where the second synchronization information includes: an SS and state information of the third terminal, and the state information of the third terminal is determined according to the state information of the first terminal; under a condition the state information sent by the third terminal indicates that the third terminal enters a pre-synchronization state, receiving time information of the third terminal is determined according to time domain resources used by transmission of the first synchronization information and receiving time information of the second terminal; third synchronization information is sent, where the third synchronization information is used to trigger the third terminal to be synchronized with the first terminal; and the first terminal is synchronized with the third terminal according to the receiving time information of the third terminal. In the disclosure, under the condition that the first terminal has received the synchronization information sent by the second terminal, the receiving time information of the third terminal is determined by utilizing the time domain resources used for transmission of the first synchronization information and the determined receiving time information of the second terminal, state confirmation of multiple steps is not needed, and the synchronization process of the first terminal and the third terminal is accelerated. The method of the disclosure may be applied to a one-to-one or one-to-many device synchronization process, and synchronization can be realized only by setting an SS and state information in transmitted information without other complex technologies. Therefore, the method has the characteristics of high multi-device synchronization speed, simple implementation, low cost, and strong expansibility.

DETAILED DESCRIPTION OF THE EMBODIMENTS

In various embodiments of the disclosure, synchronization can be realized only by setting an SS and state information in transmitted information without other complex technologies. For purposes of clarity and understanding the objects, technical solutions and advantages of the embodiments of the disclosure, the embodiments of the disclosure are described below in combination with the accompanying drawings.

Figure 1:
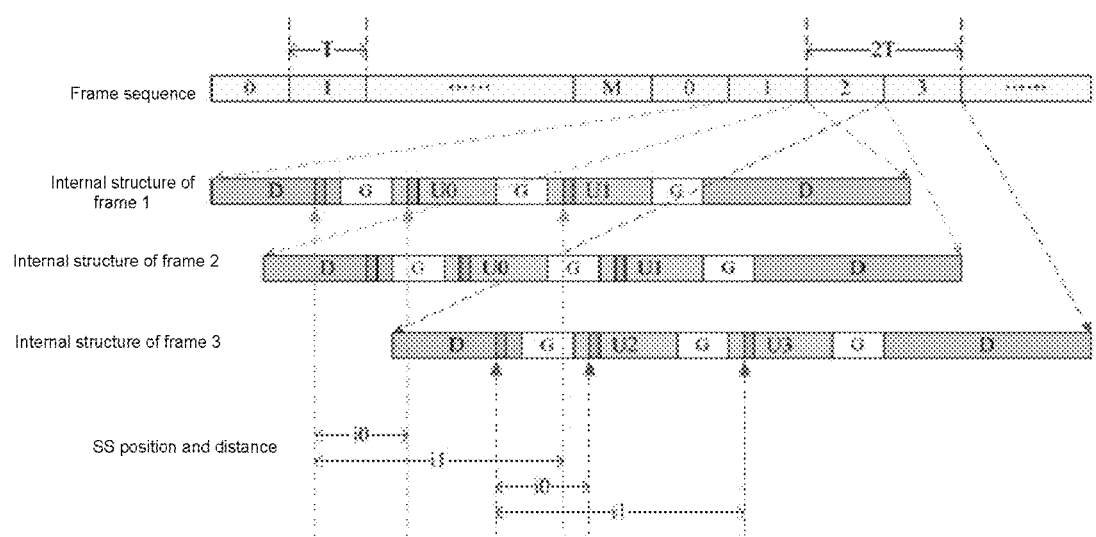
FIG. 1 is a schematic structure diagram of a communication frame according to an embodiment of the disclosure.

FIG. 1 is a schematic structure diagram of a communication frame according to an embodiment of the disclosure. The synchronization methods of the disclosure all perform data transmission with the frame structure. The frame length is T, a specific value of T may be determined according to a communication application scenario, a frame sequence number cycles from 0 to M, and M is a positive integer. Each frame consists of a D portion, a G portion, and a U portion. For convenience in description, a party needing to send more data and receive less data in each device participating in communication is named as a D-type device, a party needing to send less data and receive more data is named as a U-type device, Identifiers (IDs) need to be set for multiple U-type devices, such as U0, U1, and U2, and the corresponding IDs of the U-type devices are transmitted in the U portion of the transmission frame. The D portion in the frame is used for storing transmission data from the D-type device to the U-type device. The U portion is used for storing transmission data from the U-type device to the D-type device. The G portion is a blank portion, the G portion is not used for information transmission, and the function is to divide transmission data of different devices. Each portion in the frame is arranged into a D portion, a G portion, a U portion, a G portion, and a D portion. The U portion may be further divided into a U0 portion and a U1 portion according to needs so as to support simultaneous communication between one D-type device and two U-type devices, and the repetition period is T, as shown in an internal structure of frame 1 and an internal structure of frame 2 in FIG. 1. More U-type devices, e.g. four U-type devices, may also be supported. The data of device U2 and the data of device U3 are transmitted in the next frame of a frame where the data of device U0 and the data of device U1 are located. The rule is as follows: the transmission period of 2n U-type devices is n*T, as shown in an internal structure of frame 2 and an internal structure of frame 3 in FIG. 1. Further, a G portion is provided between the multiple U-type devices to support the multiple U-type devices to transmit signals at different locations and at different carrier frequencies.

Transmission SSs are provided at an end part of a first D portion and a front part of each U portion in a frame respectively, and are denoted as D_SS, U0_SS, and U1_SS. The distance between U0_SS and D_SS is set to be i1, and the distance between U1_SS and D_SS is set to be i2. In the presence of more U-type devices, the distance between SSs of the even-numbered U-type devices and D_SS is i1, and the distance between SSs of the odd-numbered U-type device and D_SS is i2. The SS adopts an SS suitable for mobile communication in the conventional art. For example, the SS may be generated by adopting a ZC sequence with strong autocorrelation, a root sequence number of the ZC sequence is bound with a corresponding communication end ID, an SS ID may be preset for devices participating in communication, the SS ID is used as the root sequence number of the ZC sequence, and different communication ends may be distinguished through different root sequence numbers.

Optionally, Reference Signals (RSs) are added to the D portion and the U portion respectively for transmission, the RS of the D portion is denoted as D_RS, and the RS of the U portion is denoted as U_RS.

Figure 2:
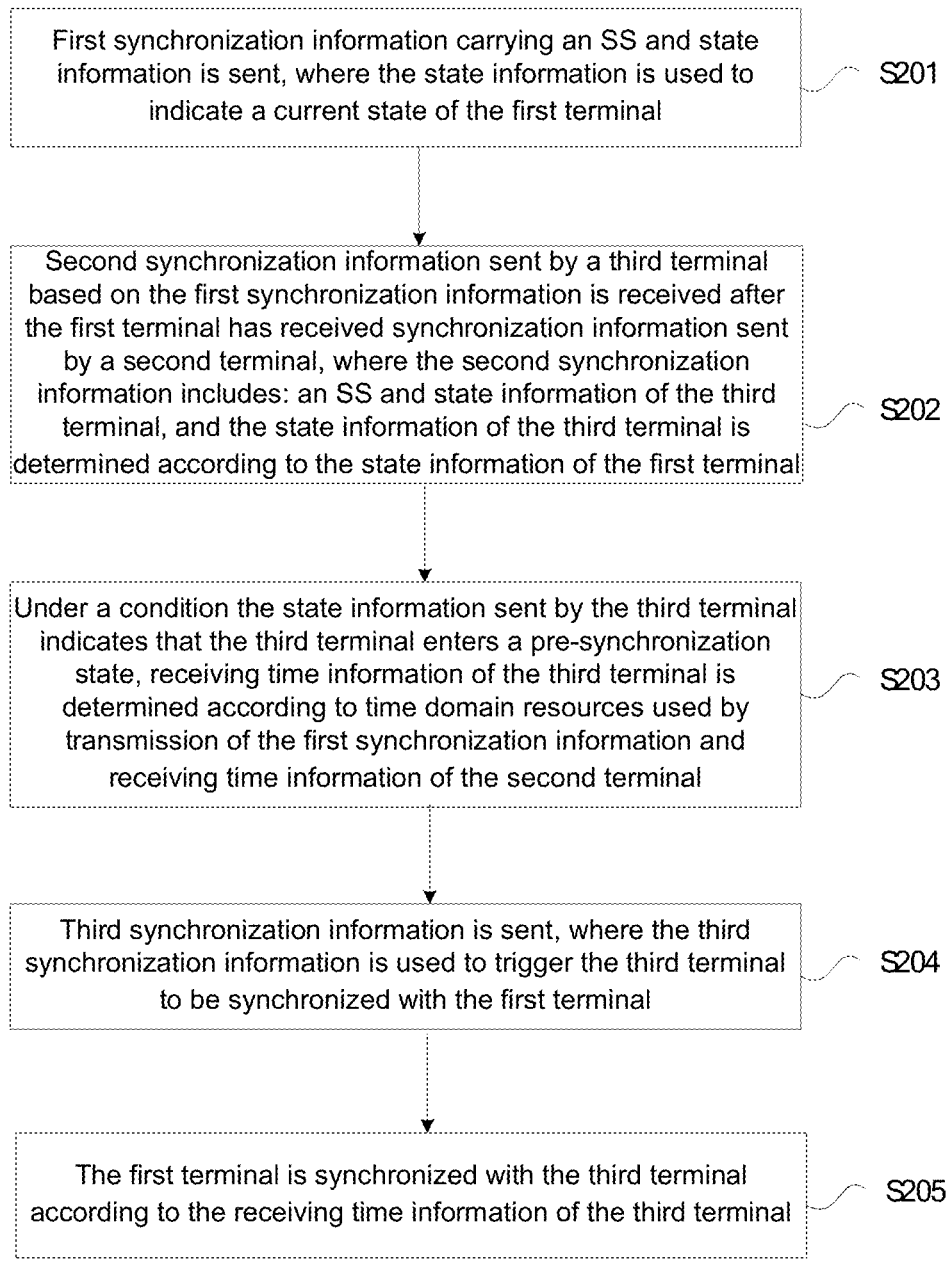
FIG. 2 is a schematic flowchart of a synchronization method according to an embodiment of the disclosure.

FIG. 2 is a schematic flowchart of a synchronization method according to an embodiment of the disclosure. The method is applied to a first terminal. As shown in FIG. 2, the synchronization method includes the following steps.

At step 201, first synchronization information carrying an SS and state information is sent, where the state information is used to indicate a current state of the first terminal.

At step 202, second synchronization information sent by a third terminal based on the first synchronization information is received after the first terminal has received synchronization information sent by a second terminal, where the second synchronization information includes: an SS and state information of the third terminal, and the state information of the third terminal is determined according to the state information of the first terminal.

At step 203, under a condition the state information sent by the third terminal indicates that the third terminal enters a pre-synchronization state, receiving time information of the third terminal is determined according to time domain resources used by transmission of the first synchronization information and receiving time information of the second terminal.

At step 204, third synchronization information is sent, where the third synchronization information is used to trigger the third terminal to be synchronized with the first terminal.

At step 205, the first terminal is synchronized with the third terminal according to the receiving time information of the third terminal.

The synchronization method of the disclosure is applied to a synchronization process of one communication end to one communication end or one communication end to multiple communication ends. The synchronization process of one communication end to multiple communication ends refers to that: one communication end needs to be synchronized with multiple communication ends simultaneously, where the one communication end is referred to as a first terminal, the first other communication end synchronized with the first terminal is referred to as a second terminal, and a terminal other than the second terminal synchronized with the first terminal is referred to as a third terminal.

For example, the first terminal may be an unmanned aerial vehicle, a broadcasting station, a certain base station in a cellular network, etc. The first terminal generally has the characteristics of sending more data and receiving less data.

The first terminal circularly sends synchronization information, so that other communication ends needing to be synchronized with the first terminal find the synchronization information and complete a synchronization process with the first terminal according to the synchronization information until the first terminal and all terminals needing to be synchronized complete synchronization.

Multiple terminals needing to be synchronized with the first terminal may try to be synchronized with the first terminal at the same time, the multiple terminals may send state information to the first terminal at the same time, and the first terminal determines a terminal as a second terminal after receiving the state information sent by this terminal, i.e. the second terminal is a terminal corresponding to the state information received by the first terminal first. Therefore, the synchronization method of the disclosure has the characteristics of simultaneous synchronization of multiple terminals, flexibility, reliability, and high synchronization speed.

It is to be noted that in the process of synchronizing the first terminal with the second terminal, synchronization failure of the first terminal with the second terminal may be caused due to terminal devices, network environments, etc. At this time, the third terminal is converted into the second terminal to complete the synchronization process with the first terminal.

In the disclosure, each of the synchronization information sent by the first terminal, the second terminal, and the third terminal is transmitted in a frame structure shown in FIG. 1, and the synchronization information includes SSs from different communication ends. In addition, each synchronization information includes state information.

The SS may also be used to uniquely determine a communication end corresponding to the synchronization information, the SS may be generated by adopting a ZC sequence with strong autocorrelation, a root sequence number of the ZC sequence is bound with a corresponding communication end ID, an SS ID may also be preset for devices participating in communication, and the SS ID is used as the root sequence number of the ZC sequence, so that the communication end sending the synchronization information may be uniquely determined through the synchronization information.

The SS contained in the synchronization information sent by the first terminal is provided in the tail part of the synchronization information. The SS contained in the synchronization information sent by the second terminal or the third terminal is provided in the front part of the synchronization information.

The state information indicates a current state of the corresponding communication end, including: an initial state, a pre-synchronization state, a synchronization state, and a working state. Other communication ends acquire the current state of the opposite terminal through the state information, so that the state of the other communication ends is changed, and the synchronization process is completed.

When the first terminal is not synchronized with any communication end, the state information of the first terminal is an initial state. After the first terminal and the second terminal are synchronized, the state information of both communication parties is in a working state.

The third terminal receives first synchronization information transmitted by the first terminal, determines sending time information of the third terminal, enters a pre-synchronization state, and sends second synchronization information. In the second synchronization information, the state information of the third terminal indicates that the third terminal enters a pre-synchronization state.

Each terminal may determine the receiving time information according to the position of time domain resources receiving the synchronization information in a time domain; and/or, each terminal may determine the sending time information according to the position of time domain resources used for sending the synchronization information in the time domain.

The sending time information of the third terminal is time information used by the third terminal to determine when to send information after the first terminal is synchronized with the third terminal, and the time information enables the first terminal to accurately receive the information sent by the third terminal. In the present embodiment, the sending time information of the third terminal may be a time domain position deviation of the SS of the third terminal and the SS of the first terminal in the time domain resources used for the transmission of the first synchronization information.

The first terminal receives the second synchronization information, confirms that the state information of the second terminal is a pre-synchronization state, sets the first terminal and the third terminal to enter a working state, determines receiving time information of the third terminal, and sends third synchronization information containing the state of the first terminal.

The receiving time information of the third terminal is time information used by the first terminal to determine when to receive information sent by the third terminal after the first terminal is synchronized with the third terminal, and the time information enables the first terminal to accurately receive the information sent by the third terminal. In the present embodiment, after the first terminal has been synchronized with the second terminal, the receiving time information of the third terminal may be determined according to the position deviation of the SS of the third terminal and the SS of the second terminal in the time domain resources used for the transmission of the first synchronization information and the receiving time information of the second terminal, state confirmation of multiple steps is not needed, and the synchronization process of the first terminal and the third terminal is accelerated.

The third terminal receives the third synchronization information, determines that the first terminal is in a working state, and sets the third terminal to enter the working state. At this point, both communication parties are in the working state, and the synchronization process is completed.

Further, the method further includes the following steps:
fourth synchronization information sent by the second terminal based on the first synchronization information is received, where the fourth synchronization information includes: an SS and state information sent by the second terminal, and the state information of the second terminal is determined according to the state information of the first terminal;

under a condition the state information of the second terminal indicates that the second terminal enters a pre-synchronization state, receiving time information of the second terminal is determined according to a time difference between the SS of the first terminal and the SS of the second terminal in a same frame;

fifth synchronization information based on the fourth synchronization information is sent;

sixth synchronization information sent by the second terminal based on the fifth synchronization information is received, where the sixth synchronization information is used to trigger the first terminal to be synchronized with the second terminal;

seventh synchronization information based on the sixth synchronization information is sent, where the seventh synchronization information is used to trigger the second terminal to be synchronized with the first terminal; and the first terminal is synchronized with the second terminal according to the receiving time information of the second terminal.

Before the first terminal and the third terminal finish the synchronization process, the first terminal and the second terminal finish the synchronization process.

In the synchronization process of the first terminal and the second terminal, the first terminal sends first synchronization information, and state information contained in the first synchronization information indicates that the first terminal is in an initial state.

The second terminal receives the first synchronization information, confirms that the first terminal is in an initial state, and sets the state of the second terminal to be a pre-synchronization state. Sending time information of the second terminal is determined, and fourth synchronization information is sent according to the sending time information of the second terminal, where state information contained in the fourth synchronization information indicates that the second terminal is in a pre-synchronization state.

The sending time information of the second terminal is time information used by the second terminal to determine when to send information after the first terminal is synchronized with the second terminal, and the time information enables the first terminal to accurately receive the information sent by the second terminal. In the present embodiment, the sending time information of the second terminal may be a position deviation of the SS of the second terminal and the SS of the first terminal in the time domain resources used for the transmission of the first synchronization information.

The first terminal receives the fourth synchronization information, confirms that the second terminal is in a pre-synchronization state, and sets the state of the second terminal to be a synchronization state. Receiving time information of the second terminal is determined, and fifth synchronization information is sent, where state information contained in the fifth synchronization information indicates that the first terminal is in a synchronization state.

The receiving time information of the second terminal is time information used by the first terminal to determine when to receive information sent by the second terminal after the first terminal is synchronized with the second terminal, and the time information enables the first terminal to accurately receive the information sent by the second terminal. In the present embodiment, the receiving time information of the second terminal is a time difference between the SS of the first terminal and the SS of the second terminal in a frame where the fourth synchronization information is located.

The second terminal receives the fifth synchronization information, confirms that the first terminal is in a synchronization state, and sets the state of the second terminal to be a synchronization state. Sending time information of the second terminal is confirmed again, and sixth synchronization information is sent according to the confirmed sending time information of the second terminal, where state information contained in the sixth synchronization information indicates that the second terminal is in a synchronization state.

Since various interference signals exist in the network, the signal may also have the condition of sudden power change in the emission and transmission processes. Therefore, the influence of environmental interference can be reduced and the reliability of the synchronization process can be improved through two-time state interaction and two-time sending time information confirmation before a working state.

The first terminal receives the sixth synchronization information, confirms that the second terminal is in a synchronization state, and sets the state of the second terminal to be a working state. Seventh synchronization information is sent, where state information contained in the seventh synchronization information indicates that the first terminal is in a working state.

The second terminal receives the seventh synchronization information, determines that the first terminal is in a working state, and sets the second terminal to enter the working state. At this point, both communication parties are in the working state, and the synchronization process is completed.

Further, the method further includes the following step:

a first RS is sent, where the sending time of the first RS has a predetermined time correlation with the SS sent by the first terminal, and the first RS is used for the second terminal to determine the sending time information of the second terminal based on the predetermined time correlation, and/or the third terminal to determine the sending time information of the third terminal based on the predetermined time correlation.

The predetermined time correlation means that there is certainty between a first RS and time when the first terminal sends an SS, so that the time when the first terminal sends the SS may be estimated through the first RS. The first RS may be calculated by a simple addition and subtraction algorithm to estimate the drift of the SS sent by the first terminal over time. After the communication end enters a working state, the synchronization timing is adjusted by using the RS, and a more stable and reliable synchronization result may be obtained. For example, the first RS has a predetermined time offset relative to the SS sent by the first terminal. After the second terminal or the third terminal receives a first RS, the sending time of the first terminal for sending the SS may be obtained according to the receiving time and the time offset of the first RS, but under a condition the currently actually obtained or stored sending time is inconsistent with the calculated sending time, the actual or stored sending time may be corrected according to the calculated sending time.

Further, the operation that first synchronization information carrying an SS and state information is sent includes that:

the first synchronization information is sent according to a period $T1$, where frequency points of two adjacent periods $T1$ for sending the first synchronization information are different, $T1>T$, and $T$ is the length of a frame.

On the one hand, the first terminal sends the first synchronization information according to the period $T1$ at different frequency points contained in a frequency point set, other communication ends needing to be synchronized may decode the synchronization information sent by the first terminal in different periods at different frequency points, the other communication ends may decode the synchronization information at other frequency points under the condition that the problem occurs in decoding the synchronization information at a certain frequency point, and the synchronization process is completed. On the other hand, the period for sending the synchronization information by the first terminal is set to be greater than the length of a frame, so that the first terminal can only send the same frame information in the same period.

Further, the operation that third synchronization information sent by the second terminal based on the first synchronization information is received includes that:

the third synchronization information is received according to a period $T2$, where frequency points of two adjacent periods $T2$ for receiving the third synchronization information are different, $t4-t3 \leq T2 < T$, $t1-t2 \leq t3-t2$, $T$ is the length of a frame, $T1$ is time when the first terminal starts receiving the SS in a same frame, $t2$ is the sending time of the SS of the first terminal in a same frame, $t3$ is the sending time of the SS of the second terminal in a same frame, and $t4$ is the sending time of the SS of the third terminal in a same frame.

On the one hand, the length of the period $T2$ is set to be greater than the time difference between the SS sending time of the third terminal and the sending time of the second terminal in a same frame, so that the first terminal does not miss the SS of the third terminal far away from the SS of the first terminal. On the one hand, the length of the period $T2$ is set to be smaller than the length $T$ of the frame, so that the first terminal cannot receive multiple pieces of synchronization information belonging to the same communication end at one time. On the other hand, the difference between the time point $t1$ when the first terminal starts receiving the SS and the SS sending time $t2$ of the first terminal is set to be smaller than the difference between the SS sending time of the second terminal in a same frame and the SS sending time $t4$ of the first terminal, so that the first terminal does not miss the SS of the second terminal closer to the SS of the first terminal.

According to the characteristics that SSs are distributed in the time domain in the disclosure, the period of searching for the SSs in the synchronization process can be reasonably determined, the SSs of multiple communication ends can be quickly found, and the synchronization process can be quickly completed.

Further, under a condition the state information of the first terminal indicates that the first terminal enters a working state and the number of terminals synchronized with the first terminal is equal to a preset value, sending of the first synchronization information is stopped.

Under a condition the state information of the first terminal indicates that the first terminal enters a working state and the number of terminals synchronized with the first terminal is equal to a preset value, all communication ends needing to be synchronized with the first terminal have completed a synchronization process with the first terminal. At this moment, the first terminal should stop sending first synchronization information for being synchronized with other communication ends.

Figure 3:
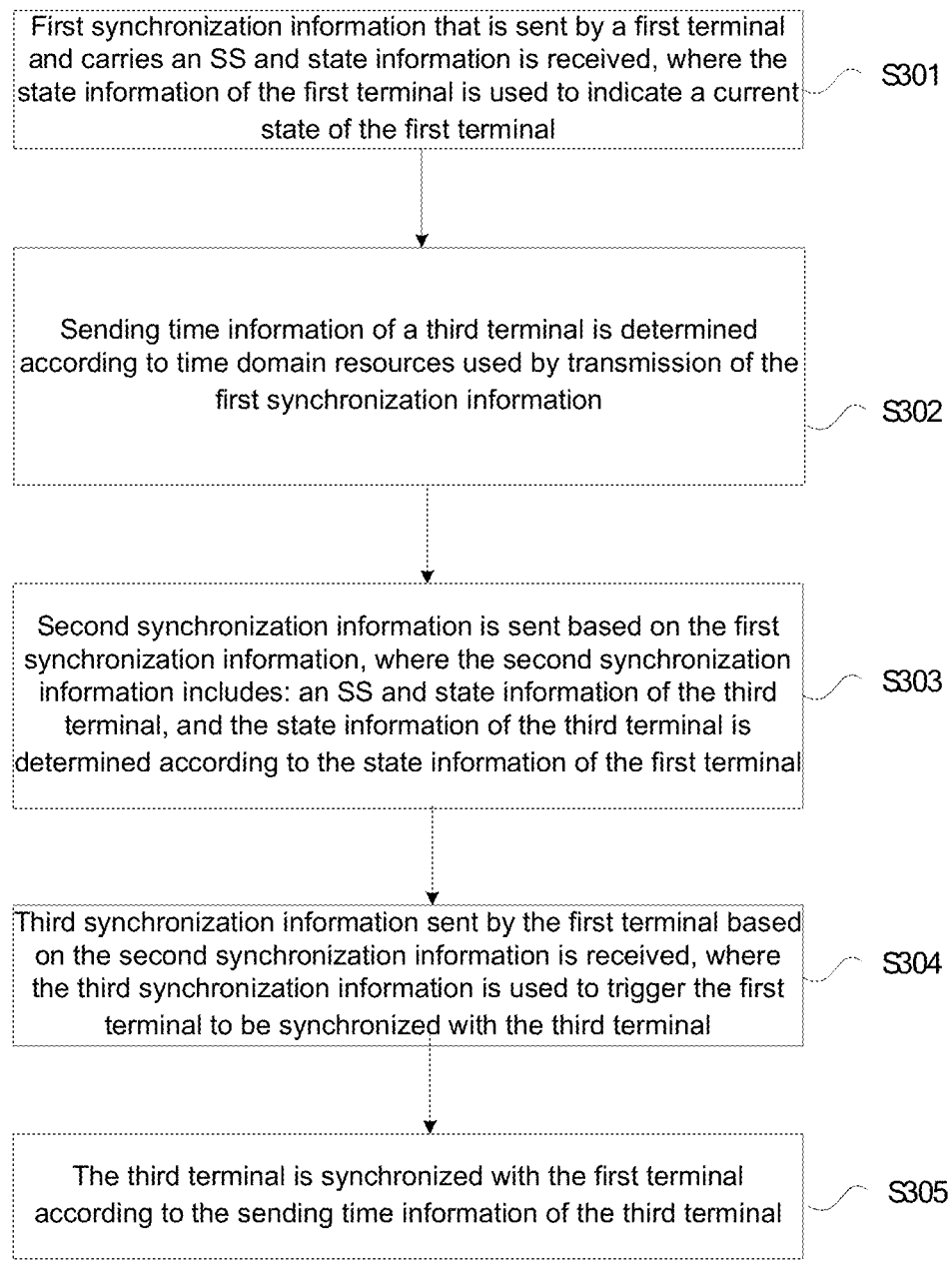
FIG. 3 is a schematic flowchart of another synchronization method according to an embodiment of the disclosure.

FIG. 3 is a schematic flowchart of another synchronization method according to an embodiment of the disclosure. As shown in FIG. 3, the synchronization method includes the following steps.

At step 301, first synchronization information that is sent by a first terminal and carries an SS and state information is received, where the state information of the first terminal is used to indicate a current state of the first terminal.

At step 302, sending time information of a third terminal is determined according to time domain resources used by transmission of the first synchronization information.

At step 303, second synchronization information is sent based on the first synchronization information, where the second synchronization information includes: an SS and state information of the third terminal, and the state information of the third terminal is determined according to the state information of the first terminal.

At step 304, third synchronization information sent by the first terminal based on the second synchronization information is received, where the third synchronization information is used to trigger the first terminal to be synchronized with the third terminal.

At step 305, the third terminal is synchronized with the first terminal according to the sending time information of the third terminal.

The synchronization method of the disclosure is applied to a synchronization process of one communication end to one communication end or one communication end to multiple communication ends. The synchronization process of one communication end to multiple communication ends refers to that: one communication end needs to be synchronized with multiple communication ends simultaneously, where the one communication end is referred to as a first terminal, the first other communication end synchronized with the first terminal is referred to as a second terminal, and a terminal other than the second terminal synchronized with the first terminal is referred to as a third terminal.

For example, the first terminal may be an unmanned aerial vehicle, a broadcasting station, a certain base station in a cellular network, etc. The first terminal generally has the characteristics of sending more data and receiving less data.

The first terminal circularly sends synchronization information, so that other communication ends needing to be synchronized with the first terminal find the synchronization information and complete a synchronization process with the first terminal according to the first synchronization information until the first terminal and all terminals needing to be synchronized complete synchronization.

Multiple terminals needing to be synchronized with the first terminal may try to be synchronized with the first terminal at the same time, the multiple terminals may send state information to the first terminal at the same time, and the first terminal determines a terminal as a second terminal after receiving the state information sent by this terminal, i.e. the second terminal is a terminal corresponding to the state information received by the first terminal first. Therefore, the synchronization method of the disclosure has the characteristics of simultaneous synchronization of multiple terminals, flexibility, reliability, and high synchronization speed.

It is to be noted that in the process of synchronizing the first terminal with the second terminal, synchronization failure of the first terminal with the second terminal may be caused due to terminal devices, network environments, etc. At this time, the third terminal is converted into the second terminal to complete the synchronization process with the first terminal.

In the disclosure, each of the synchronization information sent by the first terminal, the second terminal, and the third terminal is transmitted in a frame structure shown in FIG. 1, and the synchronization information includes SSs from different communication ends. In addition, each synchronization information includes state information.

The SS may also be used to uniquely determine a communication end corresponding to the synchronization information, the SS may be generated by adopting a ZC sequence with strong autocorrelation, a root sequence number of the ZC sequence is bound with a corresponding communication end ID, an SS ID may also be preset for devices participating in communication, and the SS ID is used as the root sequence number of the ZC sequence, so that the communication end sending the synchronization information may be uniquely determined through the synchronization information.

The SS contained in the synchronization information sent by the first terminal is provided in the tail part of the synchronization information. The SS contained in the synchronization information sent by the second terminal or the third terminal is provided in the front part of the synchronization information.

The state information indicates a current state of the corresponding communication end, including: an initial state, a pre-synchronization state, a synchronization state, and a working state. Other communication ends acquire the current state of the opposite terminal through the state information, so that the state of the other communication ends is changed, and the synchronization process is completed.

When the first terminal is not synchronized with any communication end, the state information of the first terminal is an initial state. After the first terminal and the second terminal are synchronized, the state information of both communication parties is in a working state.

The third terminal receives first synchronization information transmitted by the first terminal, determines sending time information of the third terminal, enters a pre-synchronization state, and sends second synchronization information. In the second synchronization information, the state information of the third terminal indicates that the third terminal enters a pre-synchronization state.

Each terminal may determine the receiving time information according to the position of time domain resources receiving the synchronization information in a time domain; and/or, each terminal may determine the sending time information according to the position of time domain resources used for sending the synchronization information in the time domain.

The sending time information of the third terminal is time information used by the third terminal to determine when to send information after the first terminal is synchronized with the third terminal, and the time information enables the first terminal to accurately receive the information sent by the third terminal. In the present embodiment, the sending time information of the third terminal may be a time domain position deviation of the SS of the third terminal and the SS of the first terminal in the time domain resources used for the transmission of the first synchronization information.

The first terminal receives the second synchronization information, confirms that the state information of the second terminal is a pre-synchronization state, sets the first terminal and the third terminal to enter a working state, determines receiving time information of the third terminal, and sends third synchronization information containing the state of the first terminal.

The receiving time information of the third terminal is time information used by the first terminal to determine when to receive information sent by the third terminal after the first terminal is synchronized with the third terminal, and the time information enables the first terminal to accurately receive the information sent by the third terminal. In the present embodiment, after the first terminal has been synchronized with the second terminal, the receiving time information of the third terminal may be determined according to the position deviation of the SS of the third terminal and the SS of the second terminal in the time domain resources used for the transmission of the first synchronization information and the receiving time information of the second terminal, state confirmation of multiple steps is not needed, and the synchronization process of the first terminal and the third terminal is accelerated.

The third terminal receives the third synchronization information, determines that the first terminal is in a working state, and sets the third terminal to enter the working state. At this point, both communication parties are in the working state, and the synchronization process is completed.

Further, the method further includes the following steps:

first synchronization information that is sent by a first terminal and carries an SS and state information is received, where the state information of the first terminal is used to indicate a current state of the first terminal;

under a condition the state information of the first terminal indicates that the first terminal is in an initial state, sending time information of a second terminal is determined according to time domain resources used by transmission of the first synchronization information;

fourth synchronization information is sent based on the first synchronization information, where the fourth synchronization information includes: an SS and state information of the second terminal, and the state information of the second terminal is determined according to the state information of the first terminal;

fifth synchronization information sent by the first terminal based on the fourth synchronization information is received, where the fifth synchronization information includes: an SS and state information of the first terminal, and the state information of the first terminal is used to indicate a current state of the first terminal;

under a condition the state information of the first terminal indicates that the first terminal is in a synchronization state, sending time information of the second terminal is changed according to time domain resources used by transmission of the fifth synchronization information;

sixth synchronization information based on the fifth synchronization information is sent, where the sixth synchronization information is used to trigger the first terminal to be synchronized with the second terminal;

seventh synchronization information sent by the first terminal based on the sixth synchronization information is received, where the seventh synchronization information is used to trigger the second terminal to be synchronized with the first terminal; and the second terminal is synchronized with the first terminal according to the sending time information of the second terminal.

Before the first terminal and the third terminal finish the synchronization process, the first terminal and the second terminal finish the synchronization process.

In the synchronization process of the first terminal and the second terminal, the first terminal sends first synchronization information, and state information contained in the first synchronization information indicates that the first terminal is in an initial state.

The second terminal receives the first synchronization information, confirms that the first terminal is in an initial state, and sets the state of the second terminal to be a pre-synchronization state. Sending time information of the second terminal is determined, and fourth synchronization information is sent according to the sending time information of the second terminal, where state information contained in the fourth synchronization information indicates that the second terminal is in a pre-synchronization state.

The sending time information of the second terminal is time information used by the second terminal to determine when to send information after the first terminal is synchronized with the second terminal, and the time information enables the first terminal to accurately receive the information sent by the second terminal. In the present embodiment, the sending time information of the second terminal may be a position deviation of the SS of the second terminal and the SS of the first terminal in the time domain resources used for the transmission of the first synchronization information.

The first terminal receives the fourth synchronization information, confirms that the second terminal is in a pre-synchronization state, and sets the state of the second terminal to be a synchronization state. Receiving time information of the second terminal is determined, and fifth synchronization information is sent, where state information contained in the fifth synchronization information indicates that the first terminal is in a synchronization state.

The receiving time information of the second terminal is time information used by the first terminal to determine when to receive information sent by the second terminal after the first terminal is synchronized with the second terminal, and the time information enables the first terminal to accurately receive the information sent by the second terminal. In the present embodiment, the receiving time information of the second terminal is a time difference between the SS of the first terminal and the SS of the second terminal in a frame where the fourth synchronization information is located.

The second terminal receives the fifth synchronization information, confirms that the first terminal is in a synchronization state, and sets the state of the second terminal to be a synchronization state. Sending time information of the second terminal is confirmed again, and sixth synchronization information is sent according to the confirmed sending time information of the second terminal, where state information contained in the sixth synchronization information indicates that the second terminal is in a synchronization state.

Since various interference signals exist in the network, the signal may also have the condition of sudden power change in the emission and transmission processes. Therefore, the influence of environmental interference can be reduced and the reliability of the synchronization process can be improved through two-time state interaction and two-time sending time information confirmation before a working state.

The first terminal receives the sixth synchronization information, confirms that the second terminal is in a synchronization state, and sets the state of the second terminal to be a working state. Seventh synchronization information is sent, where state information contained in the seventh synchronization information indicates that the first terminal is in a working state.

The second terminal receives the seventh synchronization information, determines that the first terminal is in a working state, and sets the second terminal to enter the working state. At this point, both communication parties are in the working state, and the synchronization process is completed.

Further, the method further includes the following step:

a second RS is sent, where the sending time of the second RS has a predetermined time correlation with the SS sent by the third terminal, and the second RS is used for the first terminal to determine the receiving time information of the third terminal based on the predetermined time correlation.

The predetermined time correlation means that there is certainty between a second RS and time when the third terminal sends an SS, so that the time when the third terminal sends the SS may be estimated through the second RS. The second RS may be calculated by a simple addition and subtraction algorithm to estimate the drift of the SS sent by the third terminal over time. After the communication end enters a working state, the synchronization timing is adjusted by using the RS, and a more stable and reliable synchronization result may be obtained. For example, the second RS has a predetermined time offset relative to the SS sent by the third terminal. After the first terminal receives a second RS, the sending time of the third terminal for sending the SS may be obtained according to the receiving time and the time offset of the second RS, but under a condition the currently actually obtained or stored sending time is inconsistent with the calculated sending time, the actual or stored sending time may be corrected according to the calculated sending time.

Further, the method further includes the following step:

a third RS is sent, where the sending time of the third RS has a predetermined time correlation with the SS sent by the second terminal, and the third RS is used for the first terminal to determine the receiving time information of the second terminal based on the predetermined time correlation.

The predetermined time correlation means that there is certainty between a third RS and time when the second terminal sends an SS, so that the time when the second terminal sends the SS may be estimated through the third RS. The third RS may be calculated by a simple addition and subtraction algorithm to estimate the drift of the SS sent by the second terminal over time. After the communication end enters a working state, the synchronization timing is adjusted by using the RS, and a more stable and reliable synchronization result may be obtained. For example, the third RS has a predetermined time offset relative to the SS sent by the second terminal. After the first terminal receives a third RS, the sending time of the second terminal for sending the SS may be obtained according to the receiving time and the time offset of the third RS, but under a condition the currently actually obtained or stored sending time is inconsistent with the calculated sending time, the actual or stored sending time may be corrected according to the calculated sending time.

Further, the operation that first synchronization information that is sent by a first terminal and carries an SS and state information is received includes that:

the first synchronization information is received according to a period T3, where frequency points of two adjacent periods T3 for receiving the first synchronization information are different, $T \leq T3 < 2T$, and T is the length of a frame.

On the one hand, the second terminal or the third terminal receives the first synchronization information at different frequency points contained in a frequency point set according to the period T3, and the second terminal or the third terminal may decode the synchronization information at other frequency points to complete the synchronization process under the condition that the problem occurs in decoding the synchronization information at a certain frequency point. On the other hand, the receiving period T3 is set to be greater than T and less than 2T, and the first terminal may receive complete frame information without receiving excessive information.

According to the characteristics that SSs are distributed in the time domain in the disclosure, the period of searching for the SSs in the synchronization process can be reasonably determined, and the SSs of multiple communication ends can be quickly found.

Further, a frequency point adopted by the second terminal to send the synchronization information is different from a frequency point adopted by the third terminal to send the synchronization information.

The second terminal and the third terminal send synchronization information by adopting different frequency points, so that mutual interference of communication ends can be reduced.

Figure 4:
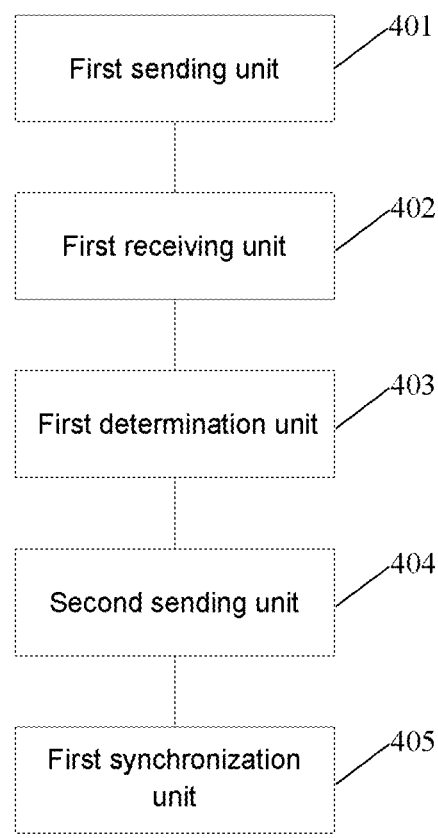
FIG. 4 is a schematic diagram of a composition structure of a synchronization apparatus according to an embodiment of the disclosure.

FIG. 4 is a schematic diagram of a composition structure of a synchronization apparatus according to an embodiment of the disclosure. The synchronization apparatus includes:

a first sending unit 401, configured to send first synchronization information carrying an SS and state information, where the state information of a first terminal is used to indicate a current state of the first terminal;

a first receiving unit 402, configured to receive second synchronization information sent by a third terminal based on the first synchronization information after the first terminal has received synchronization information sent by a second terminal, where the second synchronization information includes: an SS and state information of the third terminal, and the state information of the third terminal is determined according to the state information of the first terminal;

a first determination unit 403, configured to determine, under a condition the state information sent by the third terminal indicates that the third terminal enters a pre-synchronization state, receiving time information of the third terminal according to time domain resources used by transmission of the first synchronization information and receiving time information of the second terminal;

a second sending unit 404, configured to send third synchronization information, where the third synchronization information is used to trigger the third terminal to be synchronized with the first terminal; and a first synchronization unit 405, configured to synchronize the first terminal with the third terminal according to the receiving time information of the third terminal.

Further, the first receiving unit 402 is further configured to receive fourth synchronization information sent by the second terminal based on the first synchronization information, where the fourth synchronization information includes: an SS and state information sent by the second terminal, and the state information of the second terminal is determined according to the state information of the first terminal.

The first determination unit 403 is further configured to determine, under a condition the state information of the second terminal indicates that the second terminal enters a pre-synchronization state, receiving time information of the second terminal according to a time difference between the SS of the first terminal and the SS of the second terminal in a same frame.

The first sending unit 401 is further configured to send fifth synchronization information based on the fourth synchronization information.

The first receiving unit 402 is further configured to receive sixth synchronization information sent by the second terminal based on the fifth synchronization information, where the sixth synchronization information is used to trigger the first terminal to be synchronized with the second terminal.

The second sending unit 404 is further configured to send seventh synchronization information based on the sixth synchronization information, where the seventh synchronization information is used to trigger the second terminal to be synchronized with the first terminal.

The first synchronization unit 405 is further configured to synchronize the first terminal with the second terminal according to the receiving time information of the second terminal.

Further, the apparatus further includes: a third sending unit 406, configured to send a first RS, where the sending time of the first RS has a predetermined time correlation with the SS sent by the first terminal, and the first RS is used for the second terminal to determine the sending time information of the second terminal based on the predetermined time correlation, and/or the third terminal to determine the sending time information of the third terminal based on the predetermined time correlation.

Further, the first sending unit 401 is further configured to send the first synchronization information according to a period T1, where frequency points of two adjacent periods T1 for sending the first synchronization information are different, T1>T, and T is the length of a frame.

Further, the first receiving unit 402 is further configured to receive the third synchronization information according to a period T2, where frequency points of two adjacent periods T2 for receiving the third synchronization information are different, t4−t3≤T2<T, t1−t2<t3−t2, T is the length of a frame, T1 is time when the first terminal starts receiving the SS in a same frame, t2 is the sending time of the SS of the first terminal in a same frame, t3 is the sending time of the SS of the second terminal in a same frame, and t4 is the sending time of the SS of the third terminal in a same frame.

Further, the first sending unit 401 is further configured to stop, under a condition the state information of the first terminal indicates that the first terminal enters a working state and the number of terminals synchronized with the first terminal is equal to a preset value, sending the first synchronization information.

Figure 5:
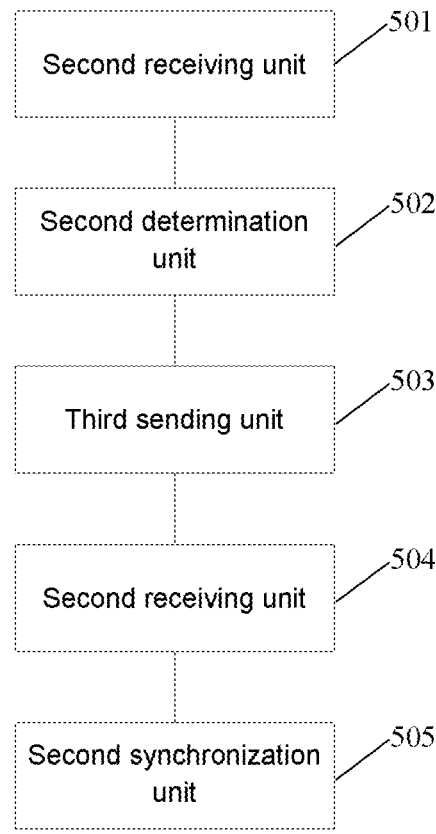
FIG. 5 is a schematic diagram of a composition structure of another synchronization apparatus according to an embodiment of the disclosure.

FIG. 5 is a schematic diagram of a composition structure of another synchronization apparatus according to an embodiment of the disclosure. The synchronization apparatus includes:
- a second receiving unit 501, configured to receive first synchronization information that is sent by a first terminal and carries an SS and state information, where the state information of the first terminal is used to indicate a current state of the first terminal;
- a second determination unit 502, configured to determine sending time information of a third terminal according to time domain resources used by transmission of the first synchronization information;
- a third sending unit 503, configured to send second synchronization information based on the first synchronization information, where the second synchronization information includes: an SS and state information of the third terminal, and the state information of the third terminal is determined according to the state information of the first terminal;
- a second receiving unit 504, configured to receive third synchronization information sent by the first terminal based on the second synchronization information, where the third synchronization information is used to trigger the third terminal to be synchronized with the first terminal; and
- a second synchronization unit 505, configured to synchronize the third terminal with the first terminal according to the sending time information of the third terminal.

Further, the second receiving unit 501 is further configured to receive first synchronization information that is sent by the first terminal and carries an SS and state information, where the state information of the first terminal is used to indicate a current state of the first terminal.

Under a condition the state information of the first terminal indicates that the first terminal is in an initial state, sending time information of a second terminal is determined according to time domain resources used by transmission of the first synchronization information.

The second determination unit 502 is further configured to send fourth synchronization information based on the first synchronization information, where the fourth synchronization information includes: an SS and state information of the second terminal, and the state information of the second terminal is determined according to the state information of the first terminal.

The second receiving unit 504 is further configured to receive fifth synchronization information sent by the first terminal based on the fourth synchronization information, where the fifth synchronization information includes: an SS and state information of the first terminal, and the state information of the first terminal is used to indicate a current state of the first terminal.

The second determination unit 502 is further configured to change, under a condition the state information of the first terminal indicates that the first terminal is in a synchronization state, sending time information of the second terminal according to time domain resources used by transmission of the fifth synchronization information.

The third sending unit 503 is further configured to send sixth synchronization information based on the fifth synchronization information, where the sixth synchronization information is used to trigger the first terminal to be synchronized with the second terminal.

The second receiving unit 504 is further configured to receive seventh synchronization information sent by the first terminal based on the sixth synchronization information, where the seventh synchronization information is used to trigger the second terminal to be synchronized with the first terminal.

The second synchronization unit 505 is further configured to synchronize the second terminal with the first terminal according to the sending time information of the second terminal.

Further, the apparatus further includes a fourth sending unit 506, configured to send a second RS, where the sending time of the second RS has a predetermined time correlation with the SS sent by the third terminal, and the second RS is used for the first terminal to determine the receiving time information of the third terminal based on the predetermined time correlation.

Further, the apparatus further includes a fifth sending unit 507, configured to send a third RS, where the sending time of the third RS has a predetermined time correlation with the SS sent by the second terminal, and the third RS is used for the first terminal to determine the receiving time information of the second terminal based on the predetermined time correlation.

Further, the second receiving unit 501 is further configured to receive the first synchronization information according to a period T3, where frequency points of two adjacent periods T3 for receiving the first synchronization information are different, T≤T3<2T, and T is the length of a frame.

Figure 6:
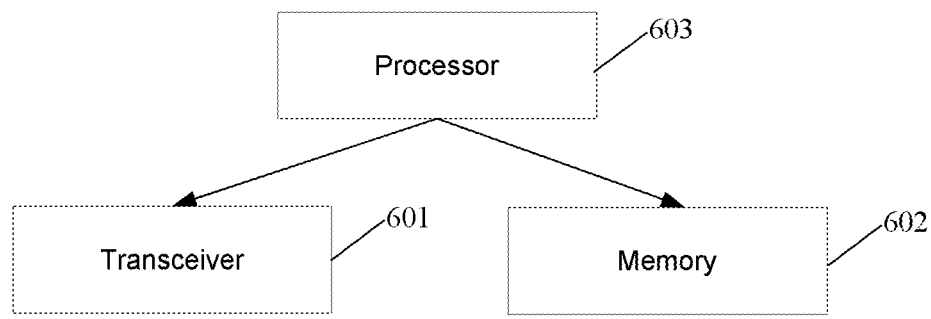
FIG. 6 is a schematic diagram of a composition structure of a network element according to an embodiment of the disclosure.

FIG. 6 is a schematic diagram of a composition structure of a network element according to an embodiment of the disclosure. The network element includes:

a transceiver 601, a memory 602, and a processor 603.

The memory 602 is configured to store computer executable instructions capable of implementing any one of the above synchronization methods.

The processor 603 is connected with the transceiver 601 and the memory 602 respectively, and configured to control the transceiver and the memory and execute the computer executable instructions.

The embodiments of the disclosure also provide a computer storage medium, storing computer executable instructions, where the computer executable instructions, when executed, are capable of implementing any one of the above synchronization methods.

Figure 7:
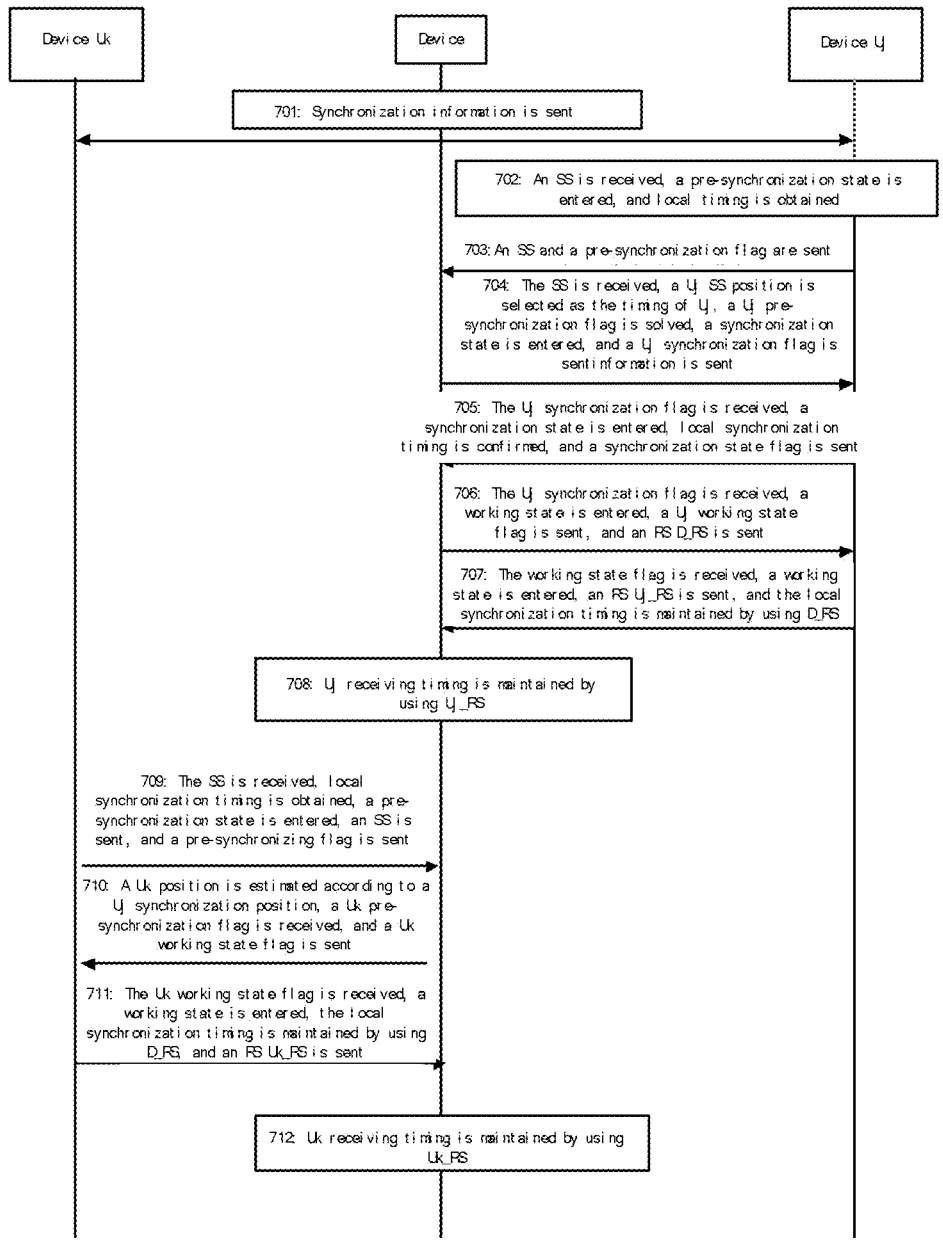
FIG. 7 is a schematic flowchart of a multi-device synchronization method according to an embodiment of the disclosure.

FIG. 7 is a schematic flowchart of a multi-device synchronization method according to an embodiment of the disclosure. The method includes the following steps.

In the preparation step, an SS ID and a device character identifier are preset for multiple wireless mobile devices participating in multi-machine communication, a frequency point set and a bandwidth used during communication are preset, and the devices (at least including one D and two U) are powered on. For convenience of description, a device U to which an SS first received by the device D in the following step 704 belongs is denoted as Uj, and a device U to which an SS then received by the device D belongs is denoted as Uk. Under a condition SSs of multiple devices U are received at the same time, the U device to which the U SSs close to D_SS belongs is denoted as Uj.

At step 701, synchronization information is sent.

The device D sends an SS over a default bandwidth.

At step 702, the SS is received, a pre-synchronization state is entered, and local timing is obtained.

The device Uj receives the SS with a window length W1 on the default bandwidth to obtain local synchronization timing, and a pre-synchronization state is entered, where w1 is greater than or equal to T and less than 2T.

At step 703, an SS and a pre-synchronization flag are sent.

The device Uj sends an SS and a pre-synchronization flag with the timing obtained in step 702.

At step 704, the SS is received, a Uj SS position is selected as the timing of Uj, a Uj pre-synchronization flag is solved, a synchronization state is entered, and a Uj synchronization flag is sent.

The device D receives the SS with a window length W2, the received SS possibly includes SSs of multiple U devices, the corresponding device U that includes the SS may be determined according to a root sequence number of the device U_SS and a relative distance between the device U and D_SS, a Uj SS position is selected as the timing of receiving Uj, a Uj pre-synchronization flag is solved, a synchronization state is entered, and a Uj synchronization flag is sent. W2 is greater than or equal to (i1−i0) and less than T, and the window is less than or equal to i0 from DSS.

At step 705, the Uj synchronization flag is received, a synchronization state is entered, local synchronization timing is confirmed, and a synchronization state flag is sent.

The device Uj receives a Uj synchronization flag, enters a synchronization state, confirms local synchronization timing, and sends a synchronization state flag.

At step 706, the Uj synchronization flag is received, a working state is entered, a Uj working state flag is sent, and an RS D_RS is sent.

The device D receives a Uj synchronization flag, enters a working state, sends a Uj working state flag, and sends an RS D_RS.

At step 707, the working state flag is received, a working state is entered, an RS Uj_RS is sent, and the local synchronization timing is maintained by using D_RS.

The device Uj receives the Uj working state flag, enters a working state, sends an RS Uj_RS, and maintains the local synchronization timing by using D_RS.

At step 708, Uj receiving timing is maintained by using Uj_RS.

The device D maintains Uj receiving timing by using Uj_RS.

At step 709, the SS is received, local synchronization timing is obtained, a pre-synchronization state is entered, an SS is sent, and a pre-synchronizing flag is sent.

The device Uk receives the SS with a window length W1 on the default bandwidth to obtain local synchronization timing, enters a pre-synchronization state, sends a pre-synchronizing flag, and sends an SS. This step may also occur in parallel during steps 1-8, depending on the power-on time and working environment of Uj and Uk.

At step 710, a Uk position is estimated according to a Uj synchronization position, a Uk pre-synchronization flag is received, and a Uk working state flag is sent.

The device D receives a Uk pre-synchronization flag, and sends a Uk working state flag. Timing rules for receiving Uk are as follows: under a condition step 709 occurs in steps 701-708, i.e. the device Uk has sent the SS, it is also possible that the device D has received the Uk SS in step 704, the position of the Uk SS is taken as Uk receiving timing, otherwise the Uk position is estimated with the obtained relative deviation (i1−i0) of the Uj synchronization position as the Uk receiving timing.

At step 711, the Uk working state flag is received, a working state is entered, the local synchronization timing is maintained by using D_RS, and an RS Uk_RS is sent.

The device Uk receives the Uk working state flag, enters a working state, maintains the local synchronization timing by using D_RS, and sends an RS Uk_RS.

At step 712, Uk receiving timing is maintained by using Uk_RS.

The device D maintains Uk receiving timing by using Uk_RS.

The wireless signal transmission in the above steps needs to be on a certain carrier frequency, and the method includes the following frequency point strategies: a frequency point set FD_SS is used for signal transmission from devices D to U, all frequency points in FD_SS are polled periodically with T_SS_D in step 701, all frequency points in FD_SS are polled periodically with T_SS_U in step 702 and step 709, and T_SS_U is less than T_SS_D. A frequency point set FU_SS is used for signal transmission from devices U to D, and a frequency point conversion period is T. Further, different frequency points in the FU_SS may be adopted by different U devices according to requirements, and the selected frequency points are related to the SS IDs of devices U.

The synchronization method includes two parts: initial synchronization and synchronization maintenance. The initial synchronization of devices D and Uj are realized in steps 701-705, the synchronization maintenance of devices D and Uj are realized in steps 706-708, and the rapid synchronization and synchronization maintenance of the device Uk are realized in steps 709-712.

Figure 8:
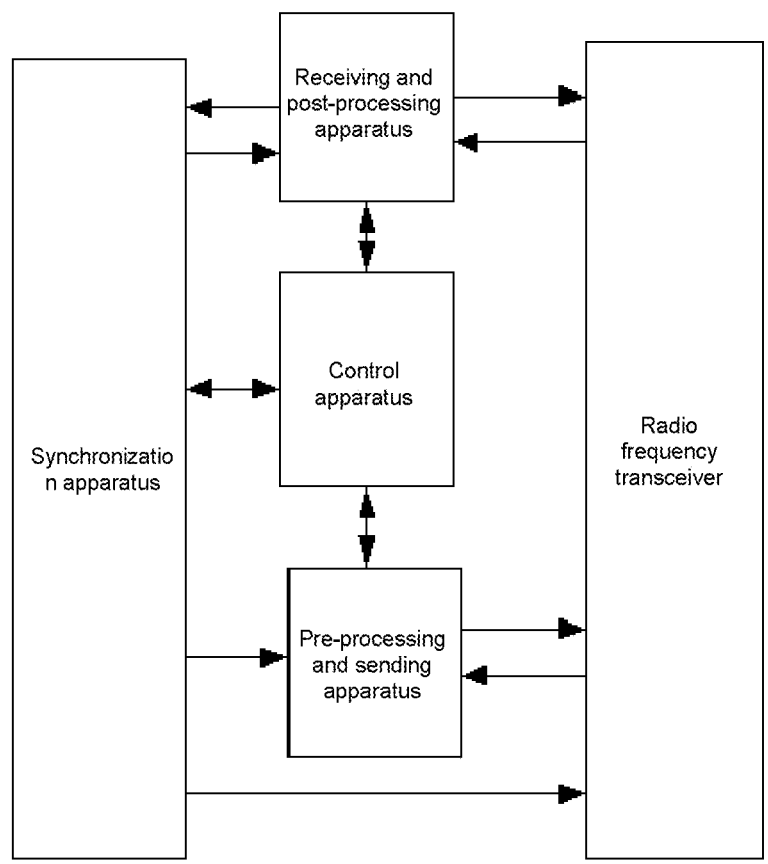
FIG. 8 is a schematic diagram of a composition structure of another synchronization apparatus according to an embodiment of the disclosure.

FIG. 8 is a schematic diagram of a composition structure of another synchronization apparatus according to an embodiment of the disclosure. The synchronization apparatus includes: a synchronization apparatus, a receiving and post-processing apparatus, a control apparatus, a pre-processing and sending apparatus, and a radio frequency transceiver.

Figure 9:
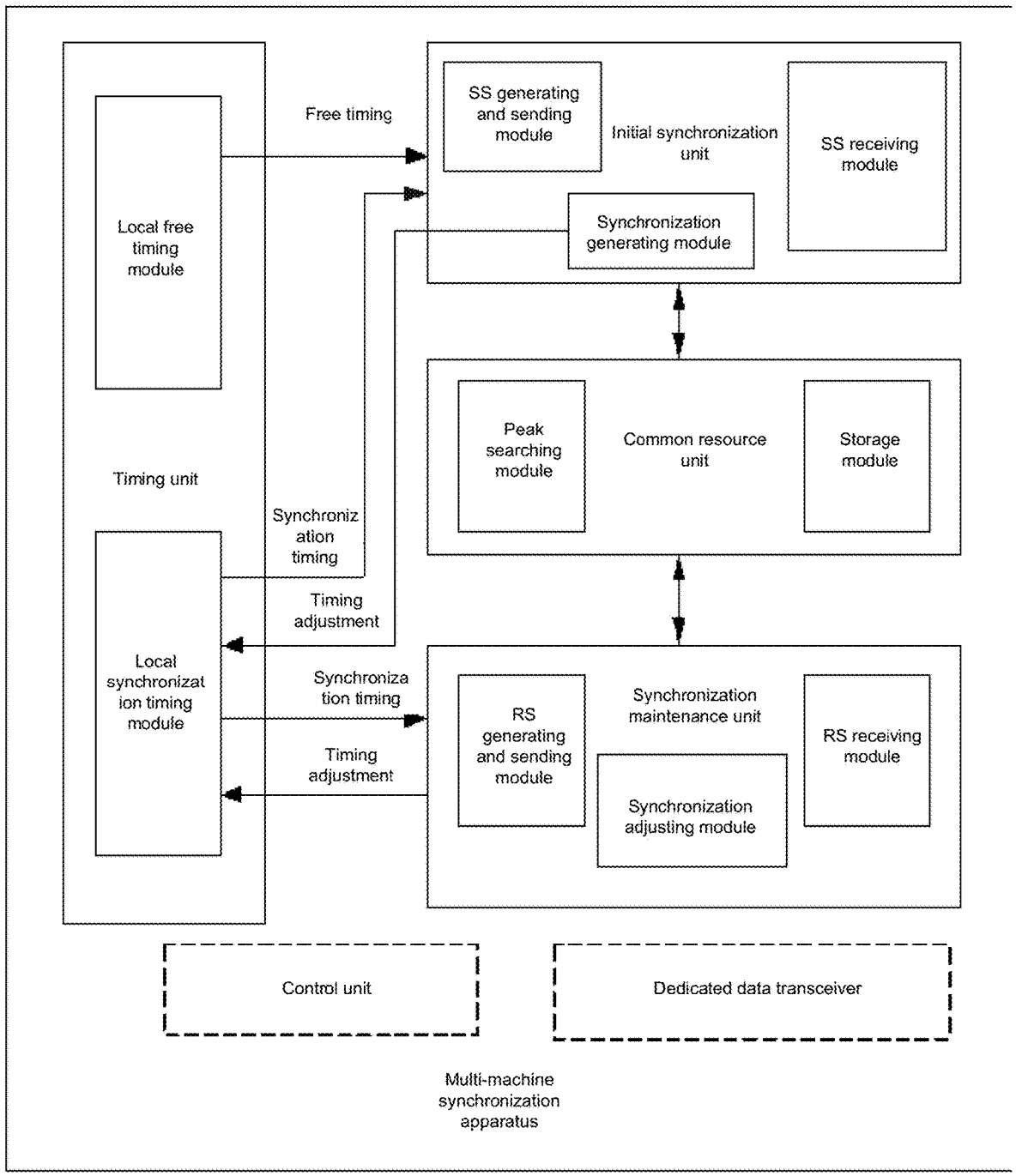
FIG. 9 is a schematic diagram of a composition structure of yet another synchronization apparatus according to an embodiment of the disclosure.

FIG. 9 is a schematic diagram of a composition structure of yet another synchronization apparatus according to an embodiment of the disclosure. The synchronization apparatus includes: a timing unit, an initial synchronization unit, a synchronization maintenance unit, a common resource unit, a dedicated data transceiver, and a control unit. The timing unit provides timing required by operation for a local device, and the timing of the initial synchronization unit and the synchronization maintenance unit is also provided by the timing unit. The initial synchronization unit is used to obtain timing information of an opposite terminal communicating with the initial synchronization unit before the initial synchronization unit is unsynchronized, and adjust the synchronization timing of the local terminal according to the obtained timing information. The synchronous maintenance unit maintains the synchronous timing of the local terminal, continuously tracks a timing drift by detecting an RS of the opposite terminal, estimates a timing adjustment quantity required by the local terminal, provides an estimation result to the timing unit, and updates the synchronization timing of the local terminal in real time by the timing unit. The common resource unit provides common resources for the initial synchronization unit and the timing maintenance unit. Since a large number of algorithms and operations of the initial synchronization unit and the timing maintenance unit are similar, and the initial synchronization and the synchronization maintenance cannot be carried out simultaneously, resources required by the two units may be extracted and put into the common resource unit when the apparatus is implemented, and the consumption of the resources is reduced. The dedicated data transceiver is used to receive and send interaction information required in an initial synchronization process.

The timing unit consists of a local free timing module and a local synchronization timing module. The local free timing module provides local free timing for a local device, and the timing does not change along with the change of opposite timing and a wireless communication channel. The local synchronization timing module provides local synchronization timing for the local device, the timing and the opposite timing are synchronized, and the timing may be updated in real time according to a timing drift result provided by the synchronization maintenance unit. When the apparatus is implemented, the synchronization timing module may maintain only deviation information from the local free timing to reduce the resource consumption of the apparatus.

The initial synchronization unit consists of an SS generating and sending module, an SS receiving module, and a synchronization generating module. The SS generating and sending module is used to generate a local SS and sending the local SS for use by an opposite terminal. The SS receiving module is used to receive SSs of one or more opposite devices in real time. According to data received by the SS receiving module, the synchronization generating module estimates SS time sequence information of the opposite terminal by using common resources, generates local initial timing, provides a timing adjustment quantity to the timing unit, and adjusts local synchronization timing by the timing unit.

The timing maintenance unit includes an RS generating and sending module, an RS receiving module, and a synchronization adjusting module. The RS generating and sending module is responsible for generating an RS and sending the RS for use by an opposite terminal. The RS receiving module is responsible for receiving the RS of an opposite device. According to data received by the RS receiving module, the synchronization adjusting module estimates an adjusting quantity required by local synchronization timing by using common resources, provides the adjusting quantity to the timing unit, and adjusts the local synchronization timing by the timing unit.

The common resource unit is different according to different specific embodiments and generally includes a peak searching module and a storage module. The storage module is configured to store wireless signal data received by a local terminal and provide a cache for operation in the initial synchronization and synchronization maintenance process. The peak searching module finds peak data representing an SS position in the data cached by the storage module, and provides a search result to the synchronization generating module in the initial synchronization unit and the synchronization adjusting module in the synchronization maintenance unit.

Since communication systems all include specialized receiving and sending apparatuses, such as the "receiving and post-processing apparatus" and the "pre-processing and sending apparatus" shown in FIG. 8, the dedicated data transceiver is implemented directly using existing apparatuses of a data transceiver subsystem responsible for transmitting data throughout the communication system, not belonging to the subject of the disclosure.

The control unit is contained in a control unit of the whole communication system, and controls and schedules the flow of the synchronization method through software by using a processor such as a CPU or a DSP in the communication system.

The method has the following characteristics:

A designed communication frame format supports one-to-one or one-to-many full-duplex communication, and has the characteristics of flexibility and strong expansibility. According to the time domain distribution characteristics of SSs, the SS receiving range in the initial synchronization process is reduced, and SSs of multiple machines are rapidly found. The device working state is divided into a pre-synchronization state, a synchronization state, and a working state. When a first device U is synchronized with a device D, the reliability of initial synchronization can be improved through interactive confirmation of two state identifiers. After the device D enters a working state, the synchronization timing of other devices U is obtained by utilizing a relationship between SS IDs among multiple devices and relative positions of SSs, and synchronization with more devices U can be quickly completed without passing through a synchronization state. The method includes synchronization maintenance, after the device enters a working state, synchronization timing is adjusted by using an RS, and a more stable and reliable synchronization result can be obtained. The work flow of the method supports that multiple devices are powered on simultaneously or sequentially, and the sequence of booting the device D and the multiple devices U has no influence on the operation result of the method. The devices D and U adopt different frequency point sets, so that interference influence can be effectively avoided, and the synchronization speed of multiple devices is improved.

According to the method of the disclosure, blank frames G are arranged between D and U in the transmission format and between different U, so that the devices D and U can be supported to work in different places, multiple U devices are supported to use different working frequency points, and the influence of environmental interference signals or mutual interference among the devices is reduced. By setting different states and carrying out two-time state interactive confirmation and multiple frequency point set periodic staggered polling strategies before the working state, interference influence can be avoided, and initial synchronization speed and reliability are improved. The synchronization of more devices U is obtained through a preset relationship between SS IDs and relative positions, the number of working frequency points when other devices U are synchronized in the working state is reduced, and the synchronization speed of the device D in the working state can be increased. In the working state, timing maintenance is carried out through an RS, and a more stable and reliable synchronization result can be obtained. The designed apparatus can reduce the resource consumption of the whole communication system through resource reuse. The designed synchronization apparatus is a common structure for two ends of point-to-point wireless mobile communication, and can be applied to a device D and multiple devices U only by modifying part of control software, so that the complexity of a communication device can be simplified, and the cost can be reduced.

Figure 10:
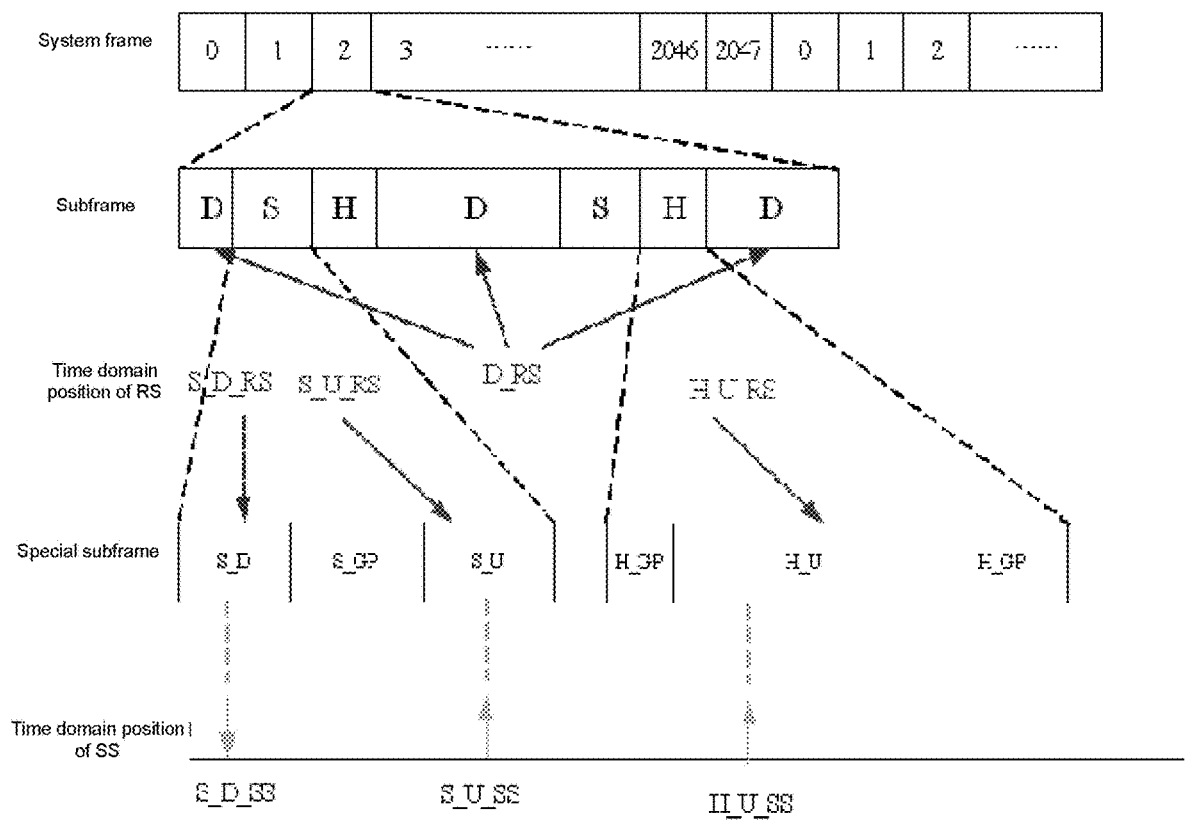
FIG. 10 is a schematic structure diagram of another communication frame according to an embodiment of the disclosure.

FIG. 10 is a schematic structure diagram of another communication frame according to an embodiment of the disclosure. A system frame (radio frame) number cycles from 0 to 2047 and a time length T of a single system frame is 5 ms. The internal structures of all system frames are the same, and the system frame may be divided into multiple subframes, including a downlink data frame D subframe, a special subframe S subframe, and a special subframe H subframe. The three types of subframes are arranged in the order D, S, H, D, S, H, and D. Further, the special subframe S may be internally divided into downlink data S_D, a guard interval S_GP, and uplink data S_U, and arranged according to the sequence. The special sub-frame H may be internally divided into a guard interval H_GP, upstream data H_U, and a guard interval H_GP, and arranged according to the sequence. Furthermore, SSs are added to S_D, S_U, and H_U for transmission, and RSs are added to D and S_D for transmission. In order to conveniently describe the designed synchronization method, the SSs are divided into three types, namely S_D_SS, S_U_SS, and H_U_SS, the three types of SSs are identical, and may be generated by adopting ZC sequences with strong autocorrelation in the conventional art, but the root sequence numbers are different, and the ZC sequences are bound with device IDs for distinguishing different devices. The time domain positions are different, the distance between S_U_SS and S_D_SS is 0.5 ms, and the distance between H_U_SS and S_D_SS is 0.9 ms. The time domain distribution characteristics are beneficial to reduce the SS searching range in the initial synchronization process and quickly find the SSs of multiple machines. The purpose of adding the RS is to carry out timing maintenance on the synchronization after the initial synchronization is completed, the RS may be generated by adopting the conventional art, and how to carry out multi-machine timing maintenance by using the RS is embodied in the synchronization maintenance process.

In combination with the above frame structure, the embodiments of the disclosure provide a synchronization method, including that: SS IDs and device character identifiers are preset for multiple devices participating in multi-machine communication, an unmanned aerial vehicle is M_A, a main remote controller is M_M, and other remote controllers are auxiliary remote controllers M_Sn (the first auxiliary remote controller is M_S1, the second auxiliary remote controller is M_S2, and so on). The devices (at least one unmanned aerial vehicle and two remote controllers) are powered on, and the sequence of power-on has no influence on the operation result of the method.

Figure 11:
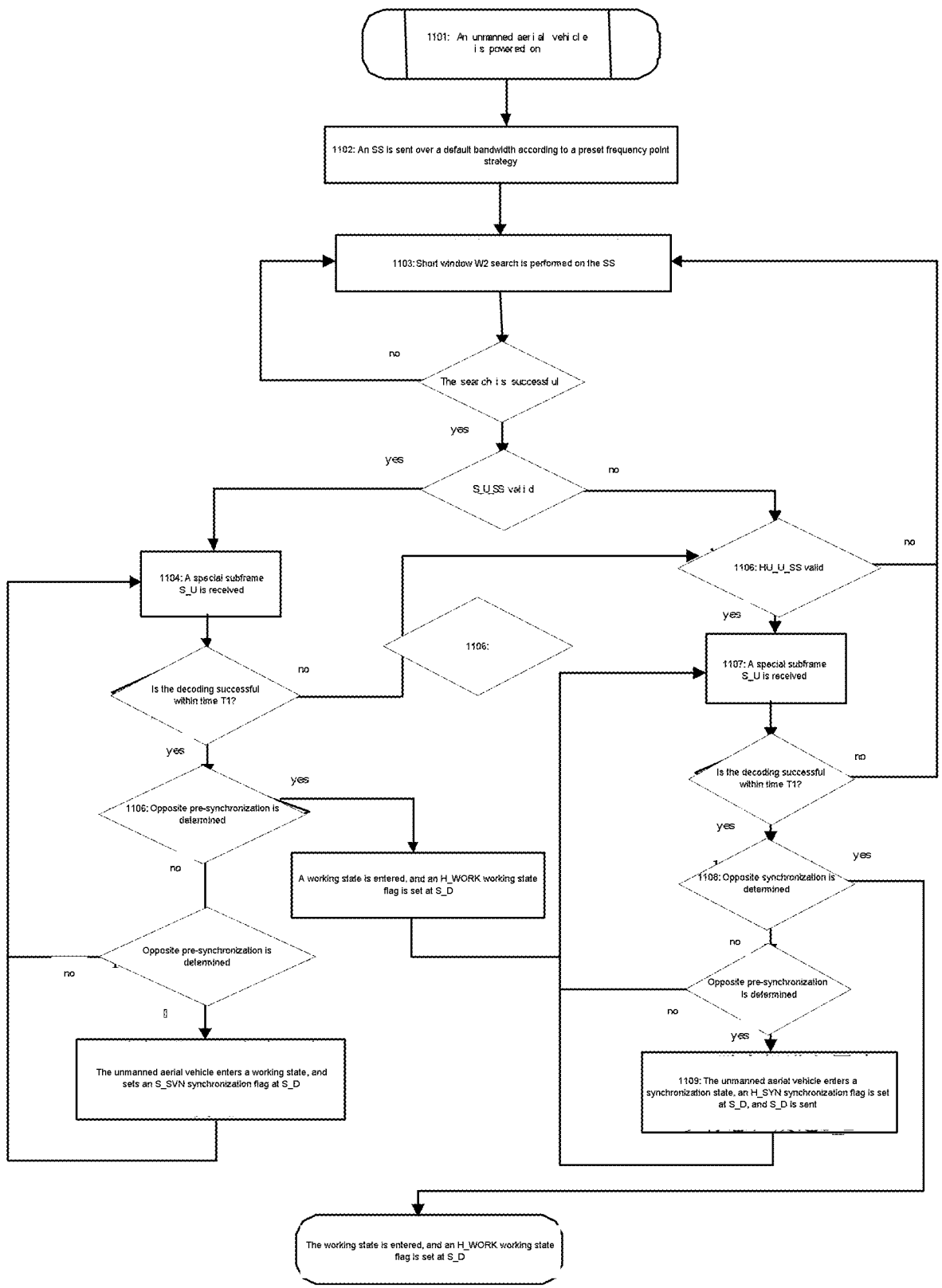
FIG. 11 is a schematic flowchart of an unmanned aerial vehicle-side synchronization method according to an embodiment of the disclosure.

FIG. 11 is a schematic flowchart of an unmanned aerial vehicle-side synchronization method according to an embodiment of the disclosure. As shown in the figure:

At step 1101, an unmanned aerial vehicle is powered on.

At step 1102, an SS is sent over a default bandwidth according to a preset frequency point strategy.

The unmanned aerial vehicle sends an SS over a default bandwidth according to a preset frequency point strategy.

At step 1103, short window W2 search is performed on the SS.

Based on local free timing, the unmanned aerial vehicle performs short window W2 search on SSs S_U_SS and H_U_SS at a predetermined special subframe, where W2 is equal to 1 ms.

Under a condition the search is not successful, the search is continued.

Under a condition the search is successful, a valid SS type is determined first, under a condition S_U_SS is valid, step 1104 is entered, otherwise step 1106 is entered.

At step 1104, a special subframe S_U is received.

The unmanned aerial vehicle receives a special subframe S_U, decodes data of S_U, and under a condition the decoding is successful within a specified time, the process proceeds to step 1105, otherwise, to step 1106.

At step 1105, opposite synchronization is detected.

It is detected whether an opposite "synchronization" identifier S_SYNC carried in data is valid, under a condition so, the unmanned aerial vehicle is set to enter an "S working state", a working state identifier S WORK is set in S_D data, S_D is sent, and the process proceeds to step 1106.

Under a condition not, it is continuously determined whether an opposite "pre-synchronization state" is valid, under a condition so, the unmanned aerial vehicle enters a synchronization state, a search result is taken as synchronization timing received by a local terminal (determined by a position deviation of an opposite SS and a local SS), an S_SYN synchronization flag is set at S_D, S_D is sent, the process returns to step 1104, and S_U is continuously received and decoded. Under a condition not, the process returns directly to step 1104, and S_U is continuously received and decoded.

At step 1106, it is determined whether H_U_SS is valid.

It is determined whether H_U_SS is valid, under a condition not, the process returns to step 1103 to perform short search again, and under a condition so, step 1107 is entered.

At step 1107, a special subframe H_U is received.

A special subframe H_U is received, data of H_U is decoded, and the process returns to step 1103 to perform short search again under a condition the decoding is not successful within the specified time. Under a condition the decoding is successful, it is detected whether an opposite "synchronization" identifier carried in the data is valid, under a condition so, an "H working state" is entered, and an H WORK working state mark is set in SD. Under a condition not, step 1108 is entered.

At step 1108, it is determined whether the opposite terminal is synchronized.

It is determined whether an opposite "pre-synchronization" identifier is valid, under a condition so, the unmanned aerial vehicle is set to enter a "synchronization state", a search result is taken as local receiving synchronization timing (determined by a position deviation of an opposite SS and a local SS), a synchronization identifier H_SYNC is set in S_D data, and the process returns to step 1107. Under a condition not, the process returns directly to step 1107, and H_U is continuously received and decoded.

At step 1109, the unmanned aerial vehicle enters a synchronization state, an H_SYN synchronization flag is set at S_D, and S_D is sent.

At step 1110, the working state is entered, and an H WORK working state flag is set at S_D.

Figure 12:
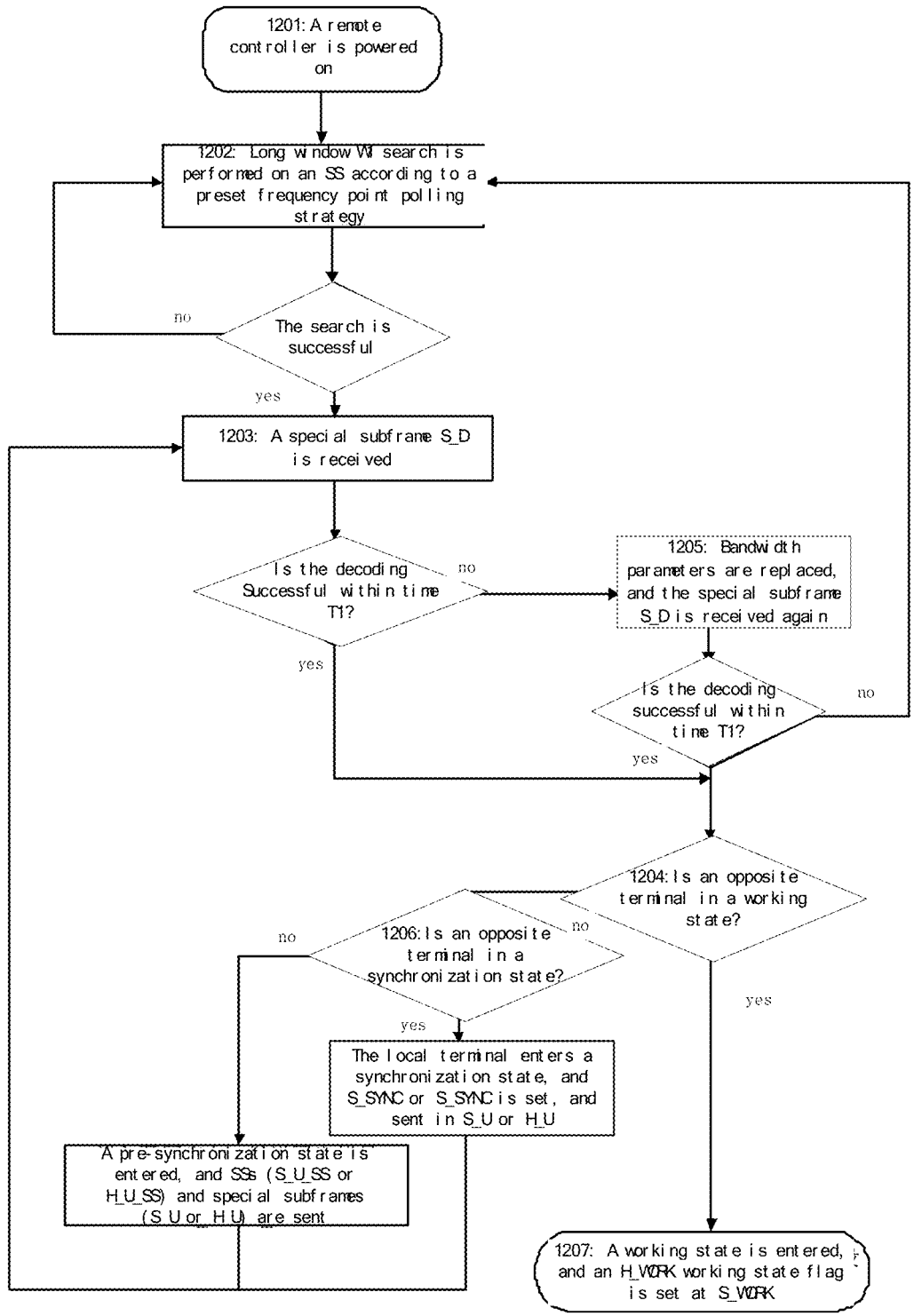
FIG. 12 is a schematic flowchart of a remote controller side according to an embodiment of the disclosure.

FIG. 12 is a schematic flowchart of a remote controller side according to an embodiment of the disclosure. As shown in the figure:

At step 1201, a remote controller is powered on.

At step 1202, long window W1 search is performed on an SS according to a preset frequency point polling strategy.

The remote controller performs long window W1 search on an SS over a default bandwidth according to a preset frequency point strategy, where W1 is set to 5 ms. Under a condition the search is successful, step 1203 is entered. Under a condition the search is not successful, the search is continued.

At step 1203, a special subframe S_D is received.

The remote controller receives a special subframe S_D, and decodes data of S_D. Under a condition the decoding is successful, step 1204 is entered. Under a condition the decoding is not successful within a specified time, step 1205 is entered.

At step 1204, it is determined whether the opposite terminal is in a working state, under a condition so, step 1207 is entered, otherwise, step 1206 is entered.

At step 1205, bandwidth parameters are replaced, the special subframe S_D is received again, under a condition the decoding is successful within the specified time, the process proceeds to step 1204, otherwise, the process returns to step 1202.

At step 1206, it is determined whether the opposite terminal is in a synchronization state, namely whether an S_SYNC valid identifier exists in S_D data. Under a condition the opposite synchronization state identifier is valid, a local terminal is set to enter a "synchronization state", S_SYNC is sent in S_U, or H_SYNC is sent in H_U, then the process returns to step 1203, and S_D is continuously received. Under a condition the opposite synchronization state identifier is invalid, the remote controller is set to enter a "pre-synchronization" state, the searched timing (from opposite timing) is taken as local "synchronization timing", and the pre-synchronization mark (S_Pre_SYNC in S_U and H_Pre_SYNC in H_U) is sent in a special subframe based on the timing, an SS is sent simultaneously (the types of the SS and the special subframe are determined by a device character, M_M sends S_U and S_U_SS, and M_Sn sends H_U and H_U_SS), and then the process returns to step 1203.

At step 1207, the working state is entered, and an S WORK or H WORK working state flag is set.

The remote controller sets the local terminal to enter a working state, sets a working state identifier S WORK in S_U, or sets a working state identifier H WORK in H_U.

Therefore, the unmanned aerial vehicle and the remote controller realize a synchronization process, and both enter a working state. In the working state, due to factors such as the movement of the unmanned aerial vehicle and the remote controller, the environment where each device is located, and the performance deviation of components, a timing deviation between the synchronized devices can be caused, out-of-synchronization can be caused when accumulation is serious, and is particularly serious when multiple devices are connected. Therefore, the disclosure also proposes a multi-machine synchronization maintenance method.

Figure 13:
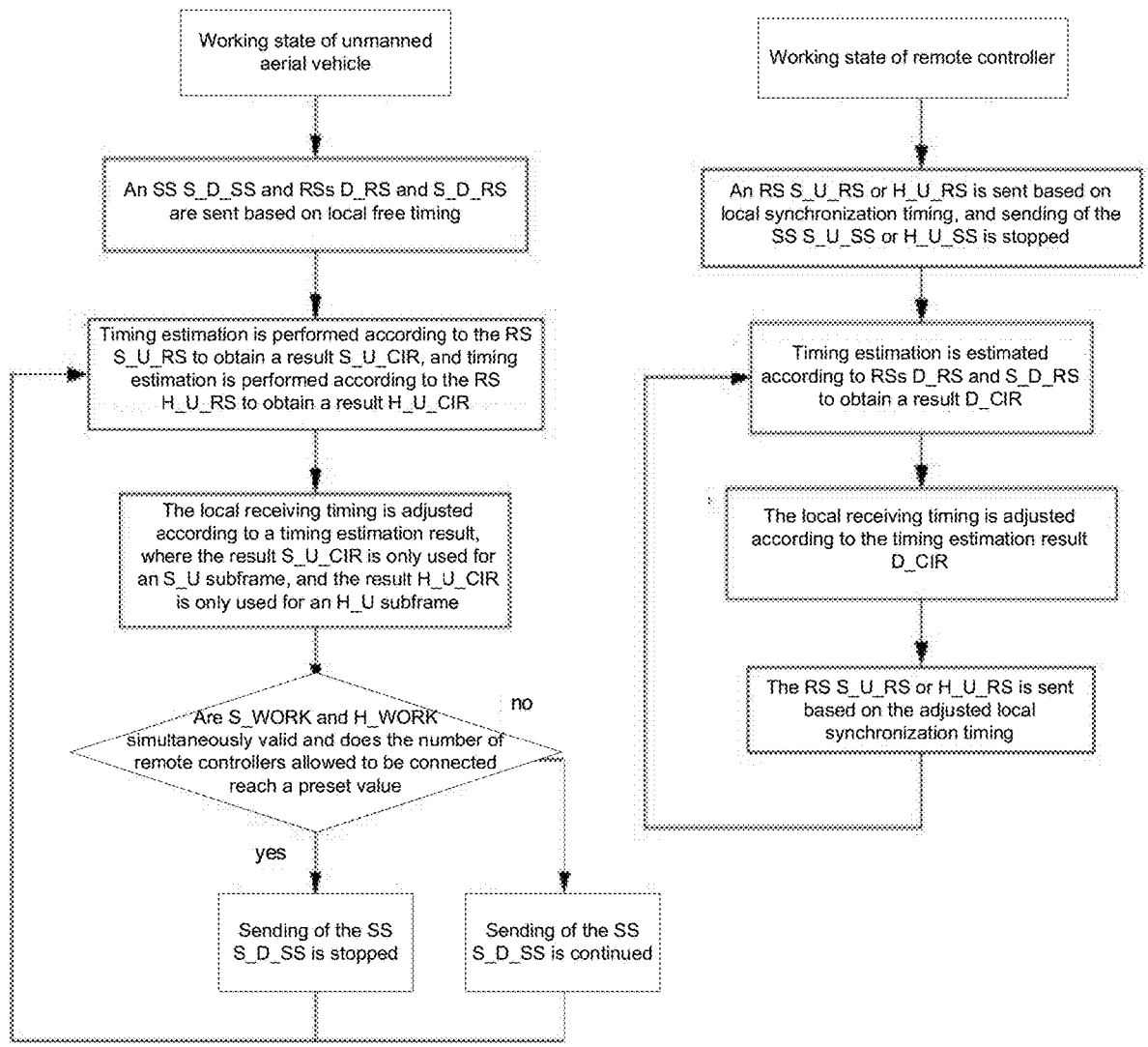
FIG. 13 is a schematic flowchart of a synchronization maintenance method according to an embodiment of the disclosure.

FIG. 13 is a schematic flowchart of a synchronization maintenance method according to an embodiment of the disclosure.

In a preparation step, an unmanned aerial vehicle and at least one remote controller enter a working state, and at least one remote controller is connected with the unmanned aerial vehicle. The unmanned aerial vehicle sets or presets the number of connectable remote controllers in real time.

The unmanned aerial vehicle-side synchronization maintenance method includes that: the unmanned aerial vehicle enters a working state; an SS S_D_SS and RSs D_RS and S_D_RS are sent based on local free timing; timing estimation is performed according to the RS S_U_RS to obtain a result S_U_CIR, and timing estimation is performed according to the RS H_U_RS to obtain a result H_U_CIR; the local receiving timing is adjusted according to a timing estimation result, where the result S_U_CIR is only used for an S_U subframe, and the result H_U_CIR is only used for an H_U subframe; the connection condition of remote controllers is determined according to the working state condition of the local terminal obtained in the synchronization process, under a condition S WORK and H WORK are simultaneously valid and the connection number of remote controllers reaches a predetermined upper limit, the working frequency is switched from FD_SS to a working frequency point set FD WORK containing more frequency points, sending of the SS S_D_SS is stopped, and the process returns to the step of performing timing estimation according to the RS; otherwise, the working frequency point set is switched back to FD_SS so that other remote controllers can be quickly synchronized, S_D_SS is continuously sent, and the process returns to the step of performing timing estimation according to the RS.

The remote controller-side synchronization maintenance method includes that: the remote controller enters a working state; an RS S_U_RS or H_U_RS is sent based on local synchronization timing; timing estimation is estimated according to RSs D_RS and S_D_RS to obtain a result D_CIR; the remote controller adjusts the local receiving timing according to a timing estimation result, and the result D_CIR is applied to all subframes, including receiving and sending; and the RS S_U_RS or H_U_RS is continuously sent based on the adjusted local synchronization timing.

An apparatus implementing multi-machine synchronization in an unmanned aerial vehicle multi-machine communication system is consistent with FIG. 9. In a specific implementation, the initial synchronization unit is configured to obtain timing information of an opposite terminal communicating with the initial synchronization unit before synchronization, and adjust the synchronization timing of a local terminal by using the obtained timing information as required. In the unmanned aerial vehicle multi-machine communication embodiment, the unmanned aerial vehicle only needs to adjust the receiving synchronization timing of the local terminal and does not need to adjust the sending synchronization timing. That is, the "synchronization timing" in FIG. 9 is input to the initial synchronization unit, acting only on the SS receiving module and not on the SS generating and sending module, and the remote controller needs to use the adjusted synchronization timing for receiving and sending. The dedicated data transceiver is used to receive and send identification information such as a "pre-synchronization state", a "synchronization state", and a "working state" required in an initial synchronization process.

The foregoing is only a preferred embodiment of the disclosure and is not intended to limit the scope of the disclosure.

INDUSTRIAL APPLICABILITY

According to the technical solutions of the embodiments of the disclosure, first synchronization information carrying an SS and state information is sent, where the state information is used to indicate a current state of the first terminal; second synchronization information sent by a third terminal based on the first synchronization information is received after the first terminal has received synchronization information sent by a second terminal, where the second synchronization information includes: an SS and state information of the third terminal, and the state information of the third terminal is determined according to the state information of the first terminal; under a condition the state information sent by the third terminal indicates that the third terminal enters a pre-synchronization state, receiving time information of the third terminal is determined according to time domain resources used by transmission of the first synchronization information and receiving time information of the second terminal; third synchronization information is sent, where the third synchronization information is used to trigger the third terminal to be synchronized with the first terminal; and the first terminal is synchronized with the third terminal according to the receiving time information of the third terminal. In the disclosure, under the condition that the first terminal has received the synchronization information sent by the second terminal, the receiving time information of the third terminal is determined by utilizing the time domain resources used for transmission of the first synchronization information and the determined receiving time information of the second terminal, state confirmation of multiple steps is not needed, and the synchronization process of the first terminal and the third terminal is accelerated. The method of the disclosure may be applied to a one-to-one or one-to-many device synchronization process, and synchronization can be realized only by setting an SS and state information in transmitted information without other complex technologies. Therefore, the method has the characteristics of high multi-device synchronization speed, simple implementation, low cost, and strong expansibility.

What claimed is:

1. A synchronization method, applied to a first terminal, the method comprising:
    sending first synchronization information carrying a Synchronization Signal (SS) and state information to a third terminal, the state information being used to indicate a current state of the first terminal;
    receiving second synchronization information sent by the third terminal based on the first synchronization information after the first terminal has received synchronization information sent by a second terminal, the second synchronization information comprising: a SS and state information of the third terminal, and the state information of the third terminal being determined according to the state information of the first terminal;
    under a condition that the state information sent by the third terminal indicates that the third terminal enters a pre-synchronization state, determining receiving time information of the third terminal according to time domain resources used for transmission of the first synchronization information and receiving time information of the second terminal;
    sending third synchronization information, the third synchronization information being used to trigger the third terminal to be synchronized with the first terminal; and
    synchronizing the first terminal with the third terminal according to the receiving time information of the third terminal.

2. The method according to claim 1, further comprising:
    receiving fourth synchronization information sent by the second terminal based on the first synchronization information, the fourth synchronization information comprising: SS and state information sent by the second terminal, and the state information of the second terminal being determined according to the state information of the first terminal;
    under a condition that the state information of the second terminal indicates that the second terminal enters a pre-synchronization state, determining receiving time information of the second terminal according to a time difference between the SS of the first terminal and the SS of the second terminal in a same frame;
    sending fifth synchronization information based on the fourth synchronization information to the second terminal;
    receiving sixth synchronization information sent by the second terminal based on the fifth synchronization information, the sixth synchronization information being used to trigger the first terminal to be synchronized with the second terminal;
    sending seventh synchronization information based on the sixth synchronization information, the seventh synchronization information being used to trigger the second terminal to be synchronized with the first terminal; and
    synchronizing the first terminal with the second terminal according to the receiving time information of the second terminal.

3. The method according to claim 1, wherein
sending first synchronization information carrying the SS and state information comprises:
sending the first synchronization information according to a period T1, wherein frequency points of two adjacent periods T1 for sending the first synchronization information are different, where T1>T, and T is the length of a frame.

4. A network element, comprising:
a transceiver, a memory, and a processor, wherein
the memory is configured to store computer executable instructions capable of implementing the method provided according to claim 1; and
the processor is connected with the transceiver and the memory respectively, and configured to control the transceiver and the memory and execute the computer executable instructions.

5. A computer storage medium, storing computer executable instructions, wherein the computer executable instructions, when executed, are capable of implementing the method provided according to claim 1.

6. The method according to claim 2, further comprising:
sending a first Reference Signal (RS), wherein the sending time of the first RS has a predetermined time correlation with the SS sent by the first terminal, and the first RS is used for the second terminal to determine the sending time information of the second terminal based on the predetermined time correlation, and/or the first RS is used for the third terminal to determine the sending time information of the third terminal based on the predetermined time correlation.

7. The method according to claim 2, wherein
receiving third synchronization information sent by the second terminal based on the first synchronization information comprises:
receiving the third synchronization information according to a period T2, wherein frequency points of two adjacent periods T2 for receiving the third synchronization information are different, where $t4-t3 \leq T2 < T$, $t1-t2 \leq t3-t2$, T is the length of a frame, T1 is time when the first terminal starts receiving the SS in a same frame, t2 is the sending time of the SS of the first terminal in a same frame, t3 is the sending time of the SS of the second terminal in a same frame, and t4 is the sending time of the SS of the third terminal in a same frame.

8. The method according to claim 2, further comprising:
under a condition that the state information of the first terminal indicates that the first terminal enters a working state and the number of terminals synchronized with the first terminal is equal to a preset value, stopping sending the first synchronization information.

9. A synchronization method, comprising:
receiving first synchronization information that is sent by a first terminal and carries a Synchronization Signal (SS) and state information, the state information of the first terminal being used to indicate a current state of the first terminal;
determining sending time information of a third terminal according to time domain resources used for transmission of the first synchronization information;
sending second synchronization information based on the first synchronization information to the first terminal, the second synchronization information comprising: a SS and state information of the third terminal, and the state information of the third terminal being determined according to the state information of the first terminal;
receiving third synchronization information sent by the first terminal based on the second synchronization information, the third synchronization information being used to trigger the first terminal to be synchronized with the third terminal; and
synchronizing the third terminal with the first terminal according to the sending time information of the third terminal.

10. The method according to claim 9, further comprising:
receiving first synchronization information that is sent by the first terminal and carries a SS and state information;
under a condition that the state information of the first terminal indicates that the first terminal is in an initial state, determining sending time information of a second terminal according to time domain resources used for transmission of the first synchronization information;
sending fourth synchronization information based on the first synchronization information to the first terminal, the fourth synchronization information comprising: a SS and state information of the second terminal, and the state information of the second terminal being determined according to the state information of the first terminal;
receiving fifth synchronization information sent by the first terminal based on the fourth synchronization information, the fifth synchronization information comprising: a SS and state information of the first terminal, and the state information of the first terminal being used to indicate a current state of the first terminal;
under a condition that the state information of the first terminal indicates that the first terminal is in a synchronization state, changing sending time information of the second terminal according to time domain resources used for transmission of the fifth synchronization information;
sending sixth synchronization information based on the fifth synchronization information, the sixth synchronization information being used to trigger the first terminal to be synchronized with the second terminal;
receiving seventh synchronization information sent by the first terminal based on the sixth synchronization information, the seventh synchronization information being used to trigger the second terminal to be synchronized with the first terminal; and
synchronizing the second terminal with the first terminal according to the sending time information of the second terminal.

11. The method according to claim 9, further comprising:
sending a second Reference Signal (RS), wherein the sending time of the second RS has a predetermined time correlation with the SS sent by the third terminal, and the second RS is used for the first terminal to determine the receiving time information of the third terminal based on the predetermined time correlation.

12. The method according to claim 9, wherein
receiving first synchronization information that is sent by a first terminal and carries a SS and state information comprises:
receiving the first synchronization information according to a period T3, wherein frequency points of two adjacent periods T3 for receiving the first synchronization information are different, where $T \leq T3 < 2T$, and T is the length of a frame.

13. A network element, comprising:
a transceiver, a memory, and a processor, wherein
the memory is configured to store computer executable instructions capable of implementing the method provided according to claim 9; and
the processor is connected with the transceiver and the memory respectively, and configured to control the transceiver and the memory and execute the computer executable instructions.

14. A computer storage medium, storing computer executable instructions, wherein the computer executable instructions, when executed, are capable of implementing the method provided according to claim 9.

15. The method according to claim 10, further comprising:
sending a third Reference Signal (RS), wherein the sending time of the third RS has a predetermined time correlation with the SS sent by the second terminal, and the third RS is used for the first terminal to determine the receiving time information of the second terminal based on the predetermined time correlation.

16. The method according to claim 10, further comprising:
a frequency point adopted by the second terminal to send the synchronization information being different from a frequency point adopted by the third terminal to send the synchronization information.

17. A synchronization apparatus, applied to a first terminal, the apparatus comprising: a hardware processor, configured to execute program modules stored on a memory, wherein the program modules comprise:
- a first sending unit, configured to send first synchronization information carrying a Synchronization Signal (SS) and state information to a third terminal, the state information being used to indicate a current state of the first terminal;
- a first receiving unit, configured to receive second synchronization information sent by the third terminal based on the first synchronization information after the first terminal has received synchronization information sent by a second terminal, the second synchronization information comprising: SS and state information of the third terminal, and the state information of the third terminal being determined according to the state information of the first terminal;
- a first determination unit, configured to determine, under a condition that the state information sent by the third terminal indicates that the third terminal enters a pre-synchronization state, receiving time information of the third terminal according to time domain resources used for transmission of the first synchronization information and receiving time information of the second terminal;
- a second sending unit, configured to send third synchronization information to the third terminal, the third synchronization information being used to trigger the third terminal to be synchronized with the first terminal; and
- a first synchronization unit, configured to synchronize the first terminal with the third terminal according to the receiving time information of the third terminal.

* * * * *